United States Patent
Farag et al.

(10) Patent No.: US 11,665,720 B2
(45) Date of Patent: May 30, 2023

(54) BEAM INDICATION CHANNEL IN A MULTI-BEAM SYSTEM

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 17/249,115

(22) Filed: Feb. 19, 2021

(65) Prior Publication Data

US 2021/0274503 A1    Sep. 2, 2021

Related U.S. Application Data

(60) Provisional application No. 63/141,757, filed on Jan. 26, 2021, provisional application No. 62/987,497, (Continued)

(51) Int. Cl.
*H04W 72/04* (2023.01)
*H04L 1/00* (2006.01)
(Continued)

(52) U.S. Cl.
CPC ....... *H04W 72/0493* (2013.01); *H04L 1/0061* (2013.01); *H04W 72/042* (2013.01); *H04W 72/046* (2013.01); *H04W 76/11* (2018.02)

(58) Field of Classification Search
CPC .......... H04W 72/0493; H04W 72/042; H04W 72/046; H04W 76/11; H04L 1/0061;
(Continued)

(56) References Cited

U.S. PATENT DOCUMENTS

2019/0141693 A1    5/2019  Guo et al.
2019/0222284 A1*   7/2019  Huang ............... H04W 72/042
(Continued)

FOREIGN PATENT DOCUMENTS

WO    2019141146 A1    7/2019

OTHER PUBLICATIONS

International Search Report and Written Opinion of the International Searching Authority dated Jun. 14, 2021, in connection with International Application No. PCT/KR2021/002469, 9 pages.
(Continued)

*Primary Examiner* — Shailendra Kumar

(57) ABSTRACT

Methods and apparatuses for beam indication channel in a multi-beam system. A method of operating a user equipment includes receiving configuration information for one or more transmission configuration indication (TCI) states, associated TCI state identifiers (IDs), and a channel conveying one or more TCI state IDs and receiving the channel conveying the one or more TCI state IDs. The method also includes determining, based on the one or more TCI state IDs, one or more spatial domain filters for at least one of reception of downlink channels and transmission of uplink channels and determining a time for applying the one or more spatial domain filters. Additionally, the method includes at least one of: receiving, starting at the determined time, the downlink channels using the one or more spatial domain filters; and transmitting, starting at the determined time, the uplink channels using the one or more spatial domain filters.

20 Claims, 17 Drawing Sheets

Fields are not necessary in order

Related U.S. Application Data filed on Mar. 10, 2020, provisional application No. 62/982,300, filed on Feb. 27, 2020.

(51) Int. Cl.
*H04W 76/11* (2018.01)
*H04W 72/044* (2023.01)

(58) Field of Classification Search
CPC ... H04L 1/0057; H04L 1/1896; H04L 5/0023; H04L 5/0094; H04L 5/0048; H04L 5/0051; H04L 5/0055; H04B 7/088; H04B 7/0695
See application file for complete search history.

(56) References Cited

U.S. PATENT DOCUMENTS

| | | | |
|---|---|---|---|
| 2019/0281587 A1* | 9/2019 | Zhang | H04W 72/10 |
| 2019/0313390 A1* | 10/2019 | Cheng | H04W 72/1257 |
| 2022/0239440 A1* | 7/2022 | Go | H04L 5/0092 |

OTHER PUBLICATIONS

Nokia, "Corrections to 38.214 including alignment of terminology across specifications in RAN1#98bis and RAN1#99," R1-1913500, 3GPP TSG RAN WG1 #99, Reno, USA, Nov. 18-22, 2019, 36 pages.

"3rd Generation Partnership Project; Technical Specification Group Radio Access Network; NR; Physical channels and modulation (Release 16)", 3GPP TS 38.211 v16.4.0, Dec. 2020, 133 pgs.

"3rd Generation Partnership Project; Technical Specification Group Radio Access Network; NR; Multiplexing and channel coding (Release 16)", 3GPP TS 38.212 v16.4.0, Dec. 2020, 152 pgs.

"3rd Generation Partnership Project; Technical Specification Group Radio Access Network; NR; Physical layer procedures for control (Release 16)", 3GPP TS 38.213 v16.4.0, Dec. 2020, 181 pgs.

"3rd Generation Partnership Project; Technical Specification Group Radio Access Network; NR; Physical layer procedures for data (Release 16)", 3GPP TS 38.214 v16.4.0, Dec. 2020, 169 pgs.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pgs.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.

* cited by examiner

Fields are not necessary in order

Fields are not necessary in order

BEAM INDICATION CHANNEL IN A MULTI-BEAM SYSTEM

CROSS-REFERENCE TO RELATED APPLICATIONS AND CLAIM OF PRIORITY

The present application claims priority to: U.S. Provisional Patent Application No. 62/982,300, filed on Feb. 27, 2020; U.S. Provisional Patent Application No. 62/987,497, filed on Mar. 10, 2020; and U.S. Provisional Patent Application No. 63/141,757, filed on Jan. 26, 2021. The content of the above-identified patent document is incorporated herein by reference.

TECHNICAL FIELD

The present disclosure relates generally to wireless communication systems and, more specifically, the present disclosure relates to a beam indication channel in a multi-beam system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a beam indication channel in a multi-beam system.

In one embodiment, a user equipment (UE) is provided. The UE includes a transceiver configured to receive configuration information for one or more transmission configuration indication (TCI) states, associated TCI state identifiers (IDs), and a channel conveying one or more TCI state IDs, and to receive the channel conveying the one or more TCI state IDs. The UE further includes a processor operably connected to the transceiver. The processor is configured to determine, based on the one or more TCI state IDs, one or more spatial domain filters for at least one of reception of downlink channels and transmission of uplink channels, and determine a time for applying the one or more spatial domain filters. The transceiver is further configured to at least one of receive, starting at the determined time, the downlink channels using the one or more spatial domain filters, and transmit, starting at the determined time, the uplink channels using the one or more spatial domain filters.

In another embodiment, a base station (BS) is provided. The BS includes a transceiver configured to transmit configuration information for one or more TCI states, associated TCI state IDs, and a channel conveying one or more TCI state IDs. The BS further includes a processor operably connected to the transceiver. The processor is configured to generate the one or more TCI state IDs associated with one or more spatial domain filters, and determine a time for applying the one or more spatial domain filters. The transceiver is further configured to transmit the channel conveying the one or more TCI state IDs and at least one of: transmit, starting at the determined time, downlink channels using the one or more spatial domain filters, and receive, starting at the determined time, uplink channels using the one or more spatial domain filters.

In yet another embodiment, a method of operating a UE is provided. The method includes receiving configuration information for one or more TCI states, associated TCI state IDs, and a channel conveying one or more TCI state IDs and receiving the channel conveying the one or more TCI state IDs. The method also includes determining, based on the one or more TCI state IDs, one or more spatial domain filters for at least one of reception of downlink channels and transmission of uplink channels and determining a time for applying the one or more spatial domain filters. Additionally, the method includes at least one of: receiving, starting at the determined time, the downlink channels using the one or more spatial domain filters; and transmitting, starting at the determined time, the uplink channels using the one or more spatial domain filters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.4.0, "NR; Physical channels and modulation"; 3GPP TS 38.212 v16.4.0, "NR; Multiplexing and Channel coding"; 3GPP TS 38.213 v16.4.0, "NR; Physical Layer Procedures for Control"; 3GPP TS 38.214 v16.4.0, "NR; Physical Layer Procedures for Data"; 3GPP TS 38.321 v16.3.0, "NR; Medium Access Control (MAC) protocol specification"; and 3GPP TS 38.331 v16.3.1, "NR; Radio Resource Control (RRC) Protocol Specification."

Figure 1:
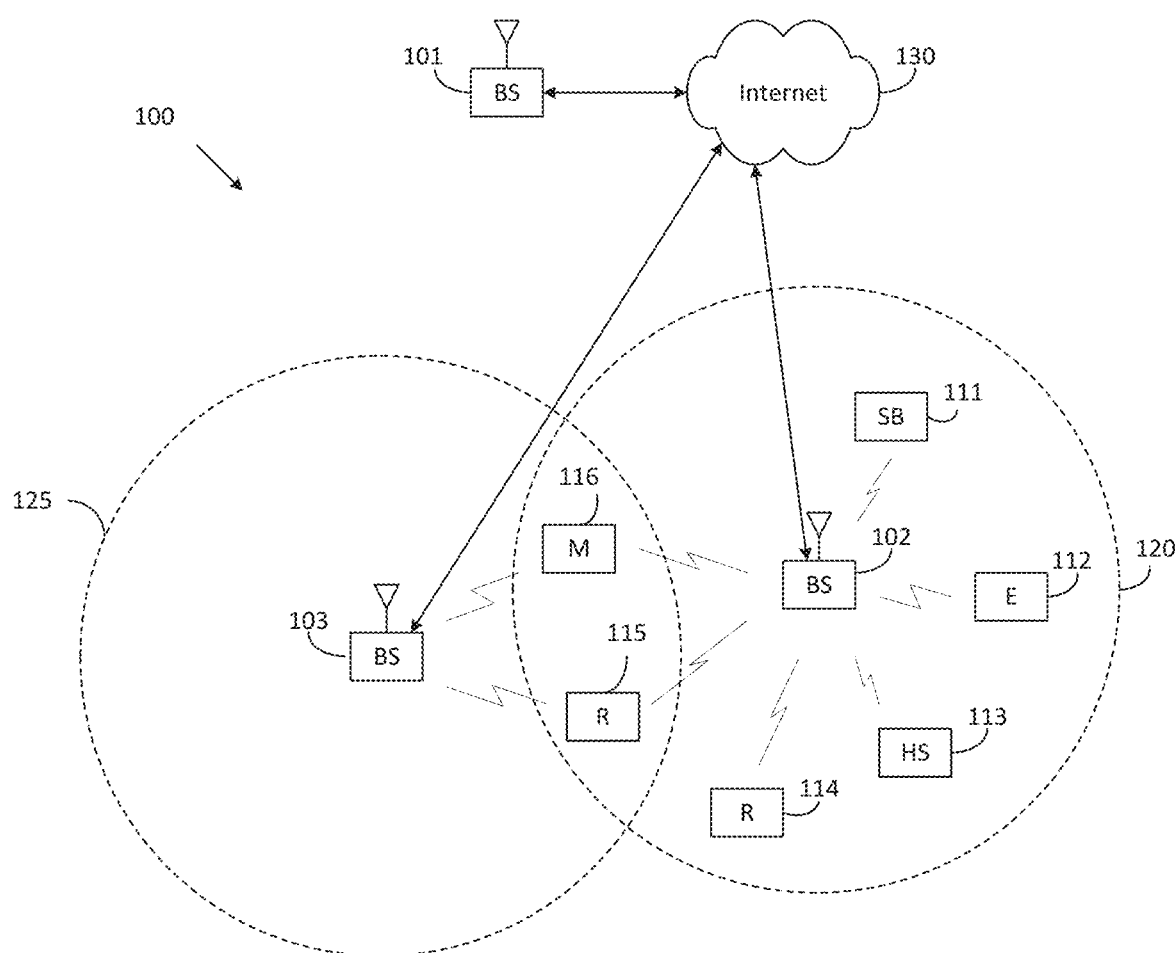
FIG. 1 illustrates an example wireless network according to embodiments of the present disclosure.
Figure 2:
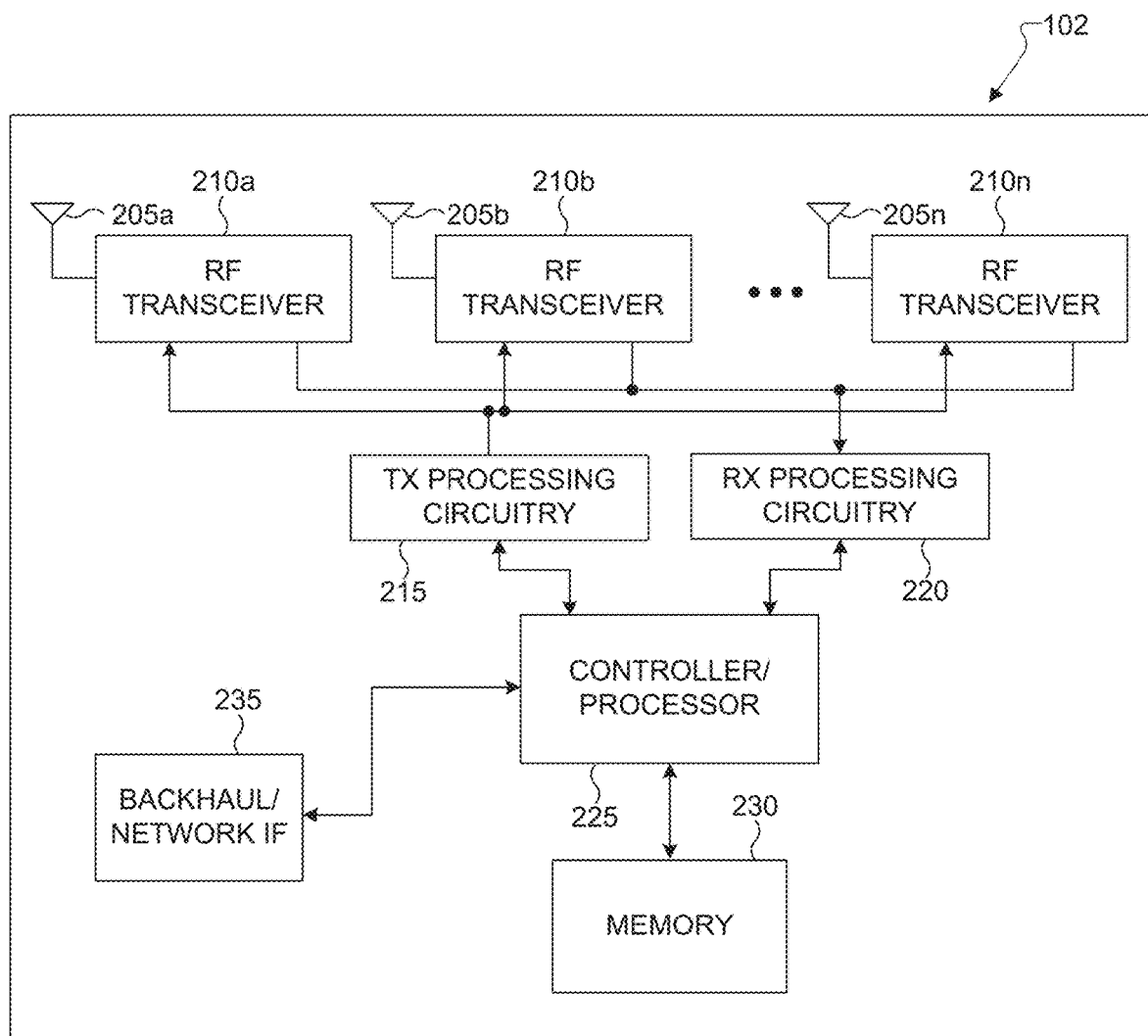
FIG. 2 illustrates an example gNB according to embodiments of the present disclosure.
Figure 3:
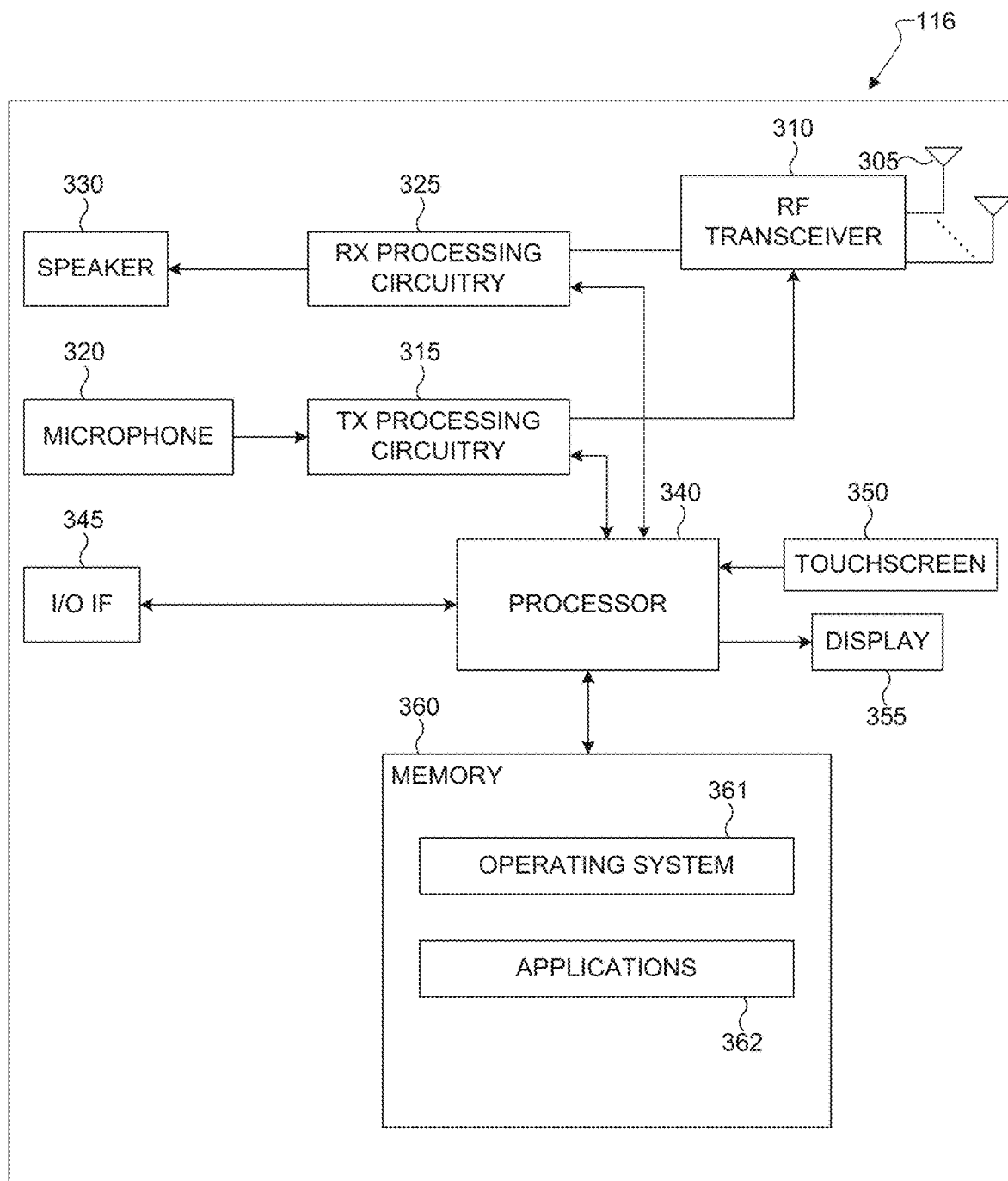
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for utilizing a beam indication channel in a multi-beam system. In certain embodiments, and one or more of the gNBs 101-103 includes circuitry, programing, or a combination thereof, for utilizing a beam indication channel in a multi-beam system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
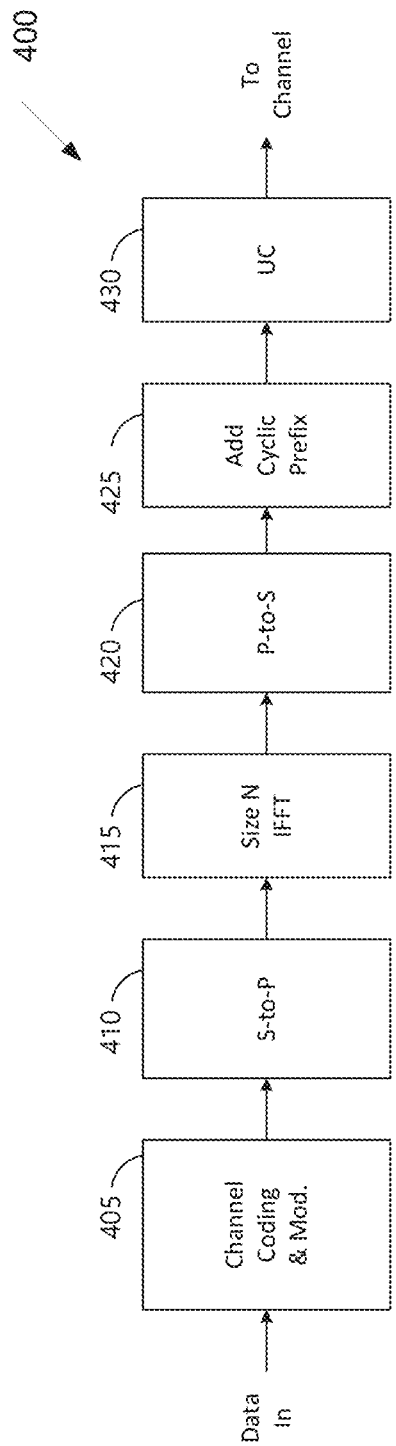
FIGS. 4 and 5 illustrate example wireless transmit and receive paths according to this disclosure.
Figure 5:
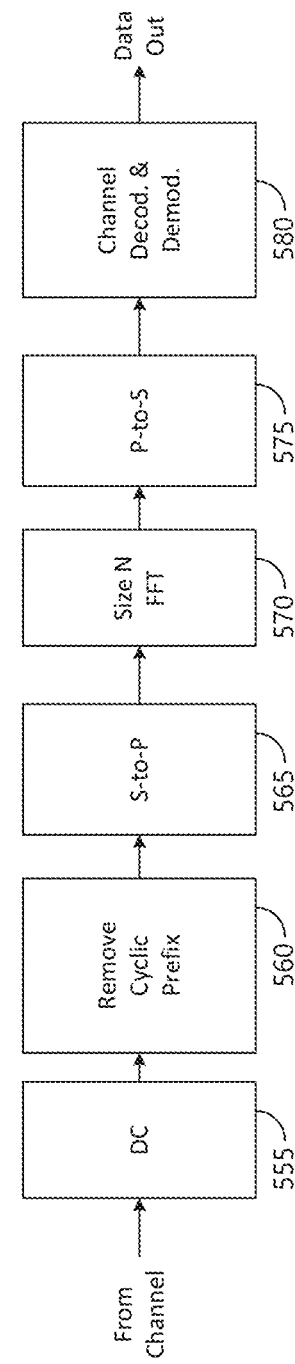

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
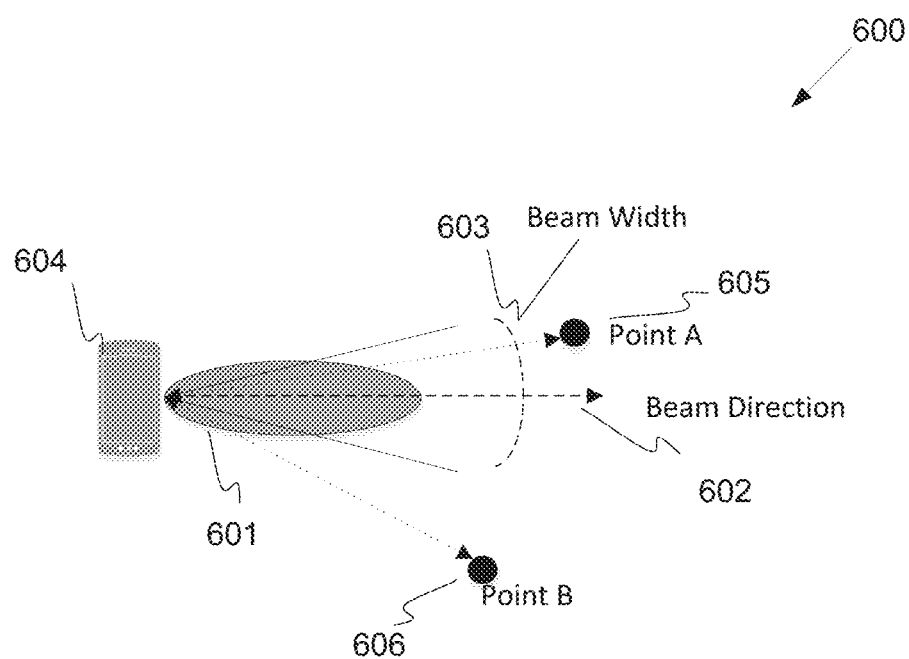
FIG. 6A illustrates an example wireless system beam according to embodiments of the present disclosure.

FIG. 6A illustrate an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604.

As illustrated in FIG. 6A, a device at point B 606 cannot receive from and transmit to the device 604 as Point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
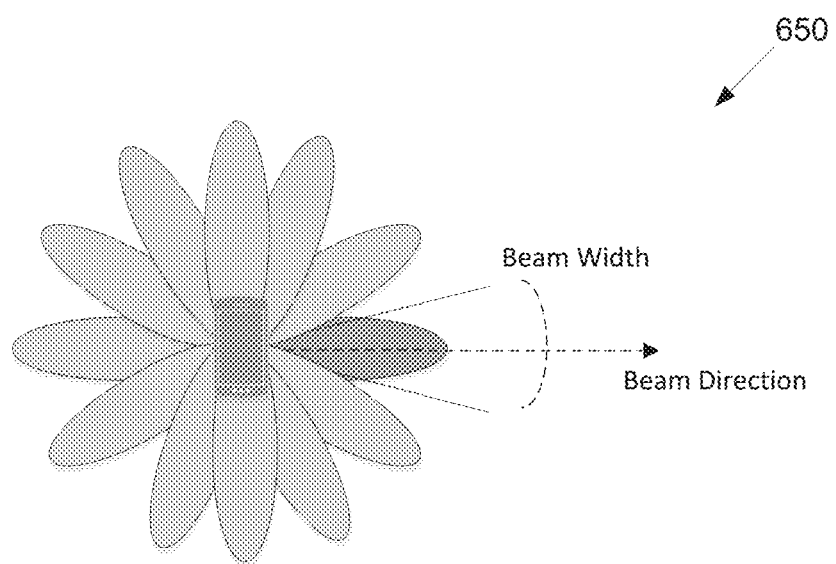
FIG. 6B illustrates an example multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
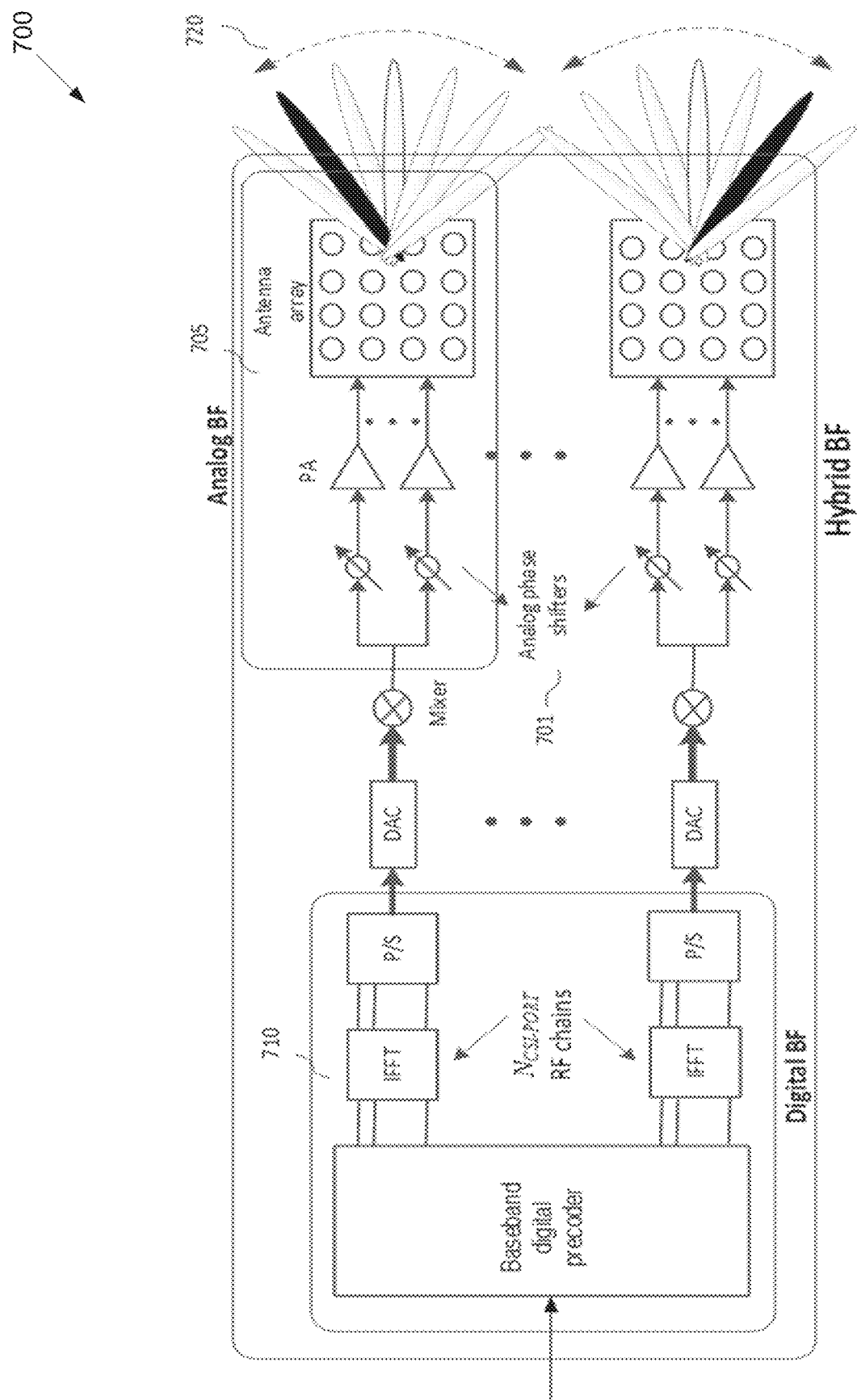
FIG. 7 illustrates an example antenna structure according to embodiments of the present disclosure.

FIG. 7 illustrate an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the described system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The described system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

In Rel.15 NR, multi-beam operation is designed primarily for single TRP and single antenna panel. Therefore, the specification supports beam indication for one TX beam wherein a TX beam is associated with a reference RS. For DL beam indication and measurement, the reference RS can be NZP CSI-RS and/or synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE. In various embodiments, a DL-related DCI or an UL-related DCI that includes a beam indication may be referred to as a beam indication channel. As used herein, a beam indication channel is a channel that conveys information indicating a beam desired or to be used, for example, including indication information such as TCI state ID.

Furthermore, a purpose-designed DL channel for beam indication can be used, by a NW/gNB, to indicate to the UE the DL-TCI and/or UL-TCI and/or Joint-TCI and/or SRI for an upcoming DL channel(s) and/or UL channel(s) transmissions. In various embodiments, the purpose-designed DL channel for beam indication may be referred to as a beam indication channel. As used herein, a beam indication channel is a channel that conveys information indicating a beam desired or to be used, for example, including indication information such as TCI state ID.

Furthermore, the beam of the beam indication channel can be designed to provider wider beam coverage than that of data and control channels and can be designed such that adjacent beams of the beam indication channel partially overlap to provide for more robust coverage in a dynamic multi-path environment.

Furthermore, for a dispersive and fast changing multi-path environment, the TCI-state of a beam indication channel can compromise of multiple beams, with a gNB transmitting the TCI indication channel on one or more of these beams. Furthermore, when the beam indication channel is to a group of UEs, the TCI-state of the beam indication channel is comprised of the beams covering the group of UEs.

In a mobile wireless system, a base station or TRP can serve multiple UEs, as a UE moves around and/or rotates, the beam management procedures can enable a NW/gNB and/or a UE to measure, report, indicate and utilize new suitable beams to communicate on. For robust operation in a multi-path environment, a gNB may be able to indicate to a UE a new and better beam as the multi-path environment changes, and for the UE to be able to reliably receive the new beam indication. As described in U.S. patent application Ser. No. 17/148,517, which is incorporated herein by reference, the beam indication channel can use wide partially overlapping beams and the beam indication channel can be sent on multiple beams. In this disclosure, using the SSB-based beams or wide beam width CSI-RS beams for the beam indication channel are provided, where these beams can provide cell-wide coverage or coverage to a certain region within the cell. Furthermore, the beam indication channel can be transmitted using the spatial filter of the SSB-based beams or wide beam width CSI-RS beams, which can be design aspects of the beam indication channel. Additionally, to enhance the operational efficiency of the network, embodiments of the present disclosure use a UE-group-based beam indication channel where a beam indication channel carries beam indication(s), such as DL/UL/or a joint TCI-state, for multiple UEs.

Furthermore, this disclosure provides a design for the beam indication channel, including aspects such as transmission resources of the beam indication channel, trigger and transmission conditions of the beam indication channel, payload of the beam indication and channel structure aspects of the beam indication channel. This disclosure provides enhancements to beam indication aspects from a NW/gNB to a UE. In this disclosure, using SSB-based beams or wide beam width CRI-RS beams that provide cell-wide coverage or coverage to a certain region within a cell for the beam indication channel is provided.

In the following, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

This disclosure provides several components which can be used in conjunction or in combination with one another or can operate as standalone schemes In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

In this disclosure, the word "associated" and "corresponding" are used interchangeably. Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, for DL, as the UE receives a reference RS index/ID in a DL assignment represented by a TCI state, the UE applies the known characteristics of the reference RS to the assigned DL transmission. The reference RS can be received and measured by the UE (in this case, the reference RS is a downlink signal such as NZP CSI-RS and/or SSB) with the result of the measurement used for calculating a beam report (in Rel.15 NR, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is an uplink signal such as SRS). As the NW/gNB receives the reference RS, the NW/gNB can measure and calculate the needed information to assign a particular DL TX beam to the UE. This option is applicable when DL-UL beam pair correspondence holds.

In another instance, for UL, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam to the UE. This option is applicable when DL-UL beam pair correspondence holds. Optionally, the reference RS can be transmitted by the UE (in this case, the reference RS is an uplink signal such as SRS or DMRS). As the NW/gNB receives the reference RS, the NW/gNB can measure and calculate the needed information to assign a particular UL TX beam to the UE.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

For mmWave (or FR2) or higher frequency bands (such as >52.6 GHz) where multi-beam operation is especially relevant, transmission-reception process includes the receiver to select a receive (RX) beam for a given TX beam. For DL multi-beam operation, the UE selects a DL RX beam for every DL TX beam (which corresponds to a reference RS). Therefore, when DL RS (such as CSI-RS and/or SSB) is used as reference RS, the NW/gNB transmits the DL RS to the UE (which is associated with a selection of DL TX beam). In response, the UE measures the DL RS (and in the process selects a DL RX beam) and reports the beam metric associated with the quality of the DL RS.

In this case, the UE determines the TX-RX beam pair for every configured (DL) reference RS. Therefore, although this knowledge is unavailable to the NW/gNB, the UE—upon receiving a DL RS (hence DL TX beam) indication from the NW/gNB—can select the DL RX beam from the knowledge on all the TX-RX beam pairs. On the other hand, when UL RS (such as SRS and/or DMRS) is used as reference RS (pertinent when DL-UL beam correspondence or reciprocity holds), the NW/gNB triggers or configures the UE to transmit the UL RS (for DL and by reciprocity, this corresponds to a DL RX beam). The gNB, upon receiving and measuring the UL RS, selects a DL TX beam. As a result, a TX-RX beam pair is derived. The NW/gNB can perform this operation for all the configured UL RSs (either per reference RS or "beam sweeping") and determine all the TX-RX beam pairs associated with all the UL RSs configured to the UE.

The following two embodiments (A-1 and A-2) are examples of DL multi-beam operations that utilize DL-TCI-based DL beam indication. In the first example embodiment (A-1), aperiodic CSI-RS is transmitted by the NW/gNB and measured by the UE. This embodiment can be used whether UL-DL beam correspondence holds or not. In the second example embodiment (A-2), aperiodic SRS is triggered by the NW and transmitted by the UE so that the NW (or a gNB) can measure the UL channel quality for the purpose of assigning a DL RX beam. This embodiment can be used when UL-DL beam correspondence holds. Although aperiodic RS is used in these two examples, periodic or semi-persistent RS can also be used.

Figure 8:
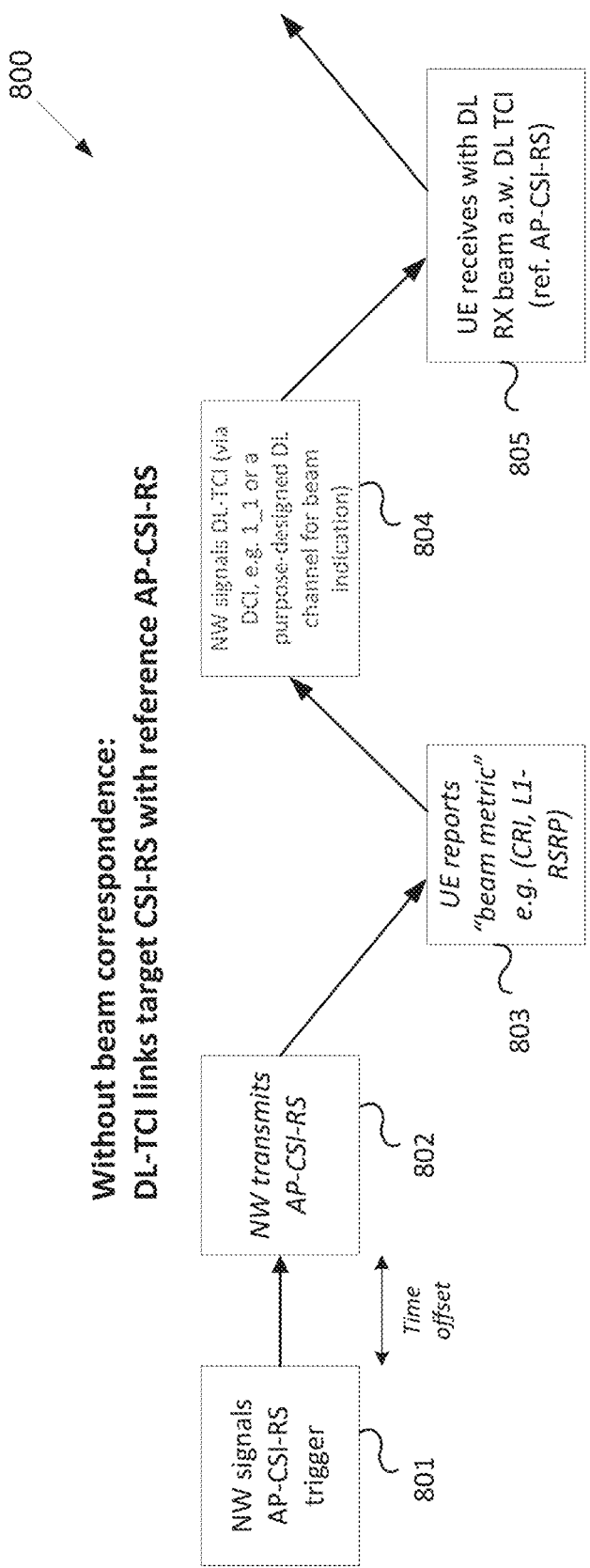
FIG. 8 illustrates an example DL multi-beam operation according to embodiments of the present disclosure.

FIG. 8 illustrates an example DL multi-beam operation 800 according to embodiments of the present disclosure. An embodiment of the DL multi-beam operation 800 shown in FIG. 8 is for illustration only.

In one example illustrated in FIG. 8 (e.g., embodiment A-1), a DL multi-beam operation 800 starts with the gNB/NW signaling to a UE an aperiodic CSI-RS (AP-CSI-RS) trigger or indication (step 801). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset).

Upon receiving the AP-CSI-RS transmitted by the gNB/NW (step 802), the UE measures the AP-CSI-RS and, in turn, calculates and reports a "beam metric" (indicating quality of a particular TX beam hypothesis) (step 803). Examples of such beam reporting are CSI-RS resource indicator (CRI) or SSB resource indicator (SSB-RI) coupled with the associated L1-RSRP/L1-RSRQ/L1-SINR/CQI.

Upon receiving the beam report from the UE, the gNB/NW can use the beam report to select a DL RX beam for the UE and indicate the DL RX beam selection (step 804) using the DL-TCI field or joint DCI field in the DL-related DCI (that carries the DL grant, such as DCI format 1_1 in NR). In this case, the DL-TCI or joint DCI indicates a reference RS (in this case, an AP-CSI-RS) representing the selected DL TX beam (by the gNB/NW). In addition, the DL-TCI or joint DCI can also indicate a "target" RS (e.g., CSI-RS) that is linked to the reference RS (in this case, an AP-CSI-RS). Upon successfully decoding the DL-related DCI with the DL-TCI or joint DCI, the UE selects a DL RX beam and performs DL reception (such as data reception via PDSCH) with the DL RX beam associated with the reference CSI-RS (step 805).

Alternatively, the gNB/NW can use the beam report to select a DL RX beam for the UE and indicate the DL RX beam selection (step 804) using a DL-TCI field or a joint DCI field for the UE in a purpose-designed DL channel for beam indication. A purpose-designed DL channel for beam indication can be UE-specific or for a group of UEs. In this case, the DL-TCI indicates a reference RS (in this case, an AP-CSI-RS) representing the selected DL TX beam (by the gNB/NW). In addition, the DL-TCI or joint DCI can also indicate a "target" RS (e.g., CSI-RS) that is linked to the reference RS (in this case, an AP-CSI-RS). Upon successfully decoding the purpose-designed DL channel for beam indication with the DL-TCI or joint DCI, the UE selects a DL RX beam and performs DL reception (such as data reception via PDSCH) with the DL RX beam associated with the reference CSI-RS (step 805).

For this embodiment (A-1), as described above, the UE selects the DL RX beam from the reference RS (in this case AP-CSI-RS) index signaled via the DL-TCI field or joint DCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

Figure 9:
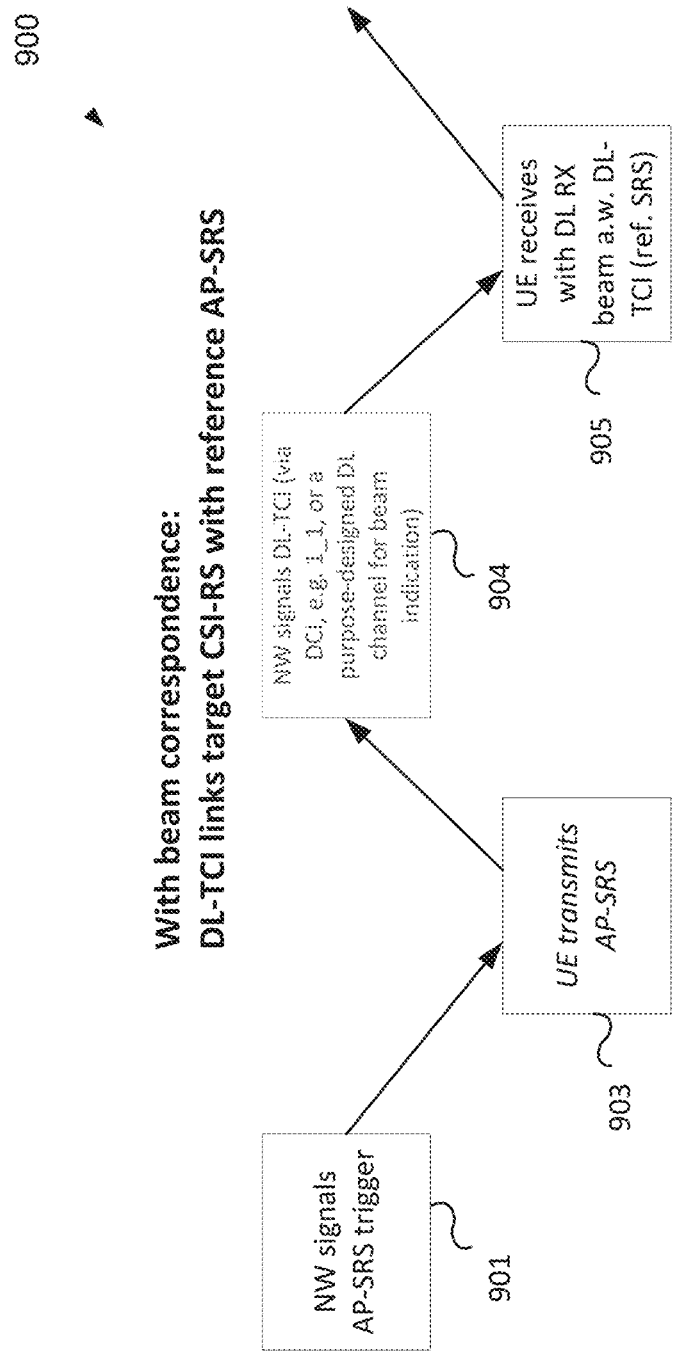
FIG. 9 illustrates another example DL multi-beam operation according to embodiments of the present disclosure.

FIG. 9 illustrates another example DL multi-beam operation 900 according to embodiments of the present disclosure. An embodiment of the DL multi-beam operation 900 shown in FIG. 9 is for illustration only.

In another example illustrated in FIG. 9 (embodiment A-2), a DL multi-beam operation 900 starts with the gNB/NW signaling to a UE an aperiodic SRS (AP-SRS) trigger or request (step 901). This trigger can be included in a DCI (either UL-related or DL-related). Upon receiving and decoding the AP-SRS trigger (step 902), the UE transmits AP-SRS to the gNB/NW (step 903) so that the NW (or gNB) can measure the UL propagation channel and select a DL RX beam for the UE for DL (assuming beam correspondence holds).

The gNB/NW can then indicate the DL RX beam selection (step 904) using the DL-TCI field or joint TCI field in the DL-related DCI (that carries the DL grant, such as DCI format 1_1 in NR). In this case, the DL-TCI or joint TCI indicates a reference RS (in this case, an AP-SRS) representing the selected DL RX beam. In addition, the DL-TCI or joint TCI can also indicate a "target" RS (e.g., CSI-RS) that is linked to the reference RS (in this case, an AP-SRS). Upon successfully decoding the DL-related DCI with the DL-TCI or joint TCI, the UE performs DL reception (such as data reception via PDSCH) with the DL RX beam indicated by the DL-TCI or joint TCI (step 905).

Alternatively, the gNB/NW can indicate the DL RX beam selection (step 904) using a DL-TCI field or joint TCI field for the UE in a purpose-designed DL channel for beam indication. A purpose-designed DL channel for beam indication can be UE-specific or for a group of UEs. In this case, the DL-TCI or joint TCI indicates a reference RS (in this case, an AP-SRS) representing the selected DL RX beam. In addition, the DL-TCI or joint TCI can also indicate a "target" RS (e.g., CSI-RS) that is linked to the reference RS (in this case, an AP-SRS). Upon successfully decoding a purpose-designed DL channel for beam indication with the DL-TCI or joint TCI, the UE performs DL reception (such as data reception via PDSCH) with the DL RX beam indicated by the DL-TCI or joint TCI (step 905).

For this embodiment (A-2), the UE selects the DL RX beam based on the UL TX beam associated with the reference RS (AP-SRS) index signaled via the DL-TCI field or joint TCI field.

Likewise, for an UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE.

On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

The following two embodiments (B-1 and B-2) are examples of UL multi-beam operations that utilize UL-TCI-based UL beam indication after the network (NW) receives some transmission from the UE. In the first example embodiment (B-1), aperiodic CSI-RS is transmitted by the NW and measured by the UE. This embodiment can be used, for instance, when reciprocity between the UL and DL beam-pair-link (BPL) holds. This condition is termed "UL-DL beam correspondence." In the second example embodiment (B-2), aperiodic SRS is triggered by the NW and transmitted by the UE so that the NW (or a gNB) can measure the UL channel quality for the purpose of assigning an UL TX beam. This embodiment can be used whether UL-DL beam correspondence holds or not. Although aperiodic RS is used in these two examples, periodic or semi-persistent RS can also be used.

Figure 10:
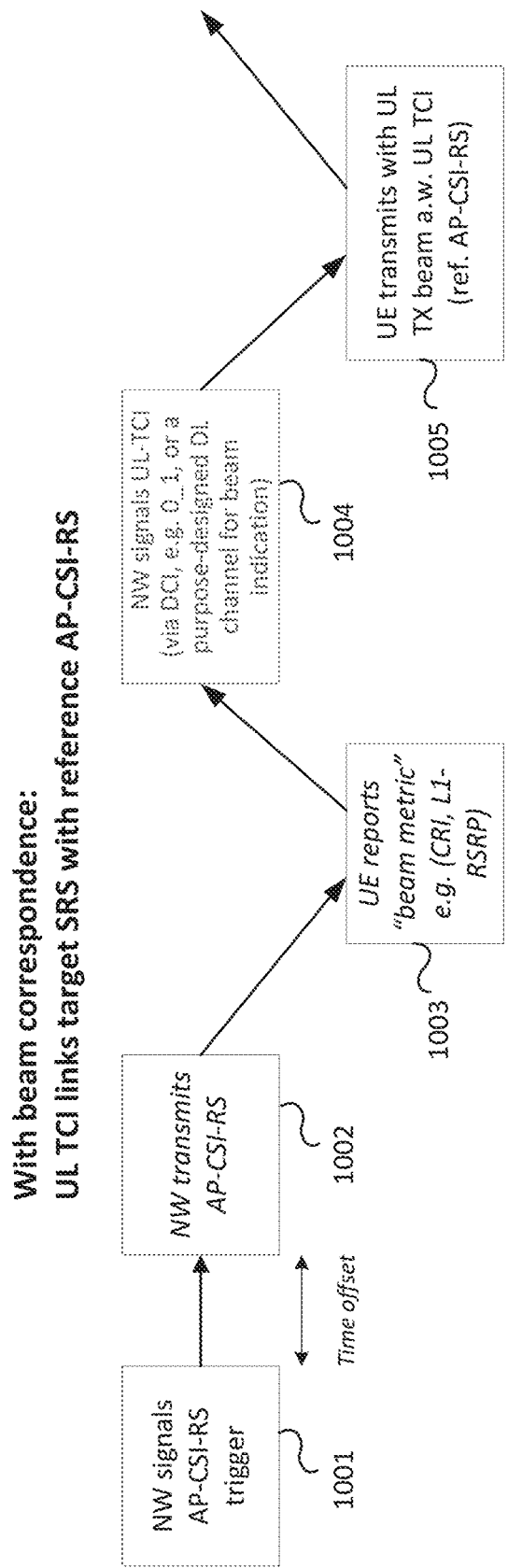
FIG. 10 illustrates an example UL multi-beam operation according to embodiments of the present disclosure.

FIG. 10 illustrates an example UL multi-beam operation 1000 according to embodiments of the present disclosure. An embodiment of the UL multi-beam operation 1000 shown in FIG. 10 is for illustration only.

As illustrated in FIG. 10 (embodiment B-1), an UL multi-beam operation 1000 starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CRI or SSB resource indicator (SSB-RI) coupled with the associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using the UL-TCI field or joint TCI field in the UL-related DCI (that carries the UL grant, such as DCI format 0_1 in NR). In this case, the UL-TCI indicates a reference RS (in this case, an AP-CSI-RS) representing the selected UL RX beam (by the gNB/NW). In addition, the UL-TCI can also indicate a "target" RS (e.g., SRS) that is linked to the reference RS (in this case, an AP-CSI-RS). Upon successfully decoding the UL-related DCI with the UL-TCI or joint TCI, the UE selects an UL TX beam and performs UL transmission (such as data transmission on PUSCH) with the UL TX beam associated with the reference CSI-RS (step 1005).

Alternatively, the gNB/NW can use the beam report to select an UL TX beam for the UE and indicate the UL TX beam selection (step 1004) using an UL-TCI field or joint TCI field for the UE in a purpose-designed DL channel for beam indication. A purpose-designed DL channel for beam indication can be UE-specific or for a group of UEs. In this case, the UL-TCI or joint TCI indicates a reference RS (in this case, an AP-CSI-RS) representing the selected UL RX beam (by the gNB/NW). In addition, the UL-TCI or joint TCI can also indicate a "target" RS (e.g., SRS) that is linked to the reference RS (in this case, an AP-CSI-RS). Upon successfully decoding a purpose-designed DL channel for beam indication with the UL-TCI or joint TCI, the UE selects an UL TX beam and performs UL transmission (such as data transmission on PUSCH) with the UL TX beam associated with the reference CSI-RS (step 1005).

For this embodiment (B-1), the UE selects the UL TX beam based on the derived DL RX beam associated with the reference RS index signaled via the UL-TCI field or joint TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

Figure 11:
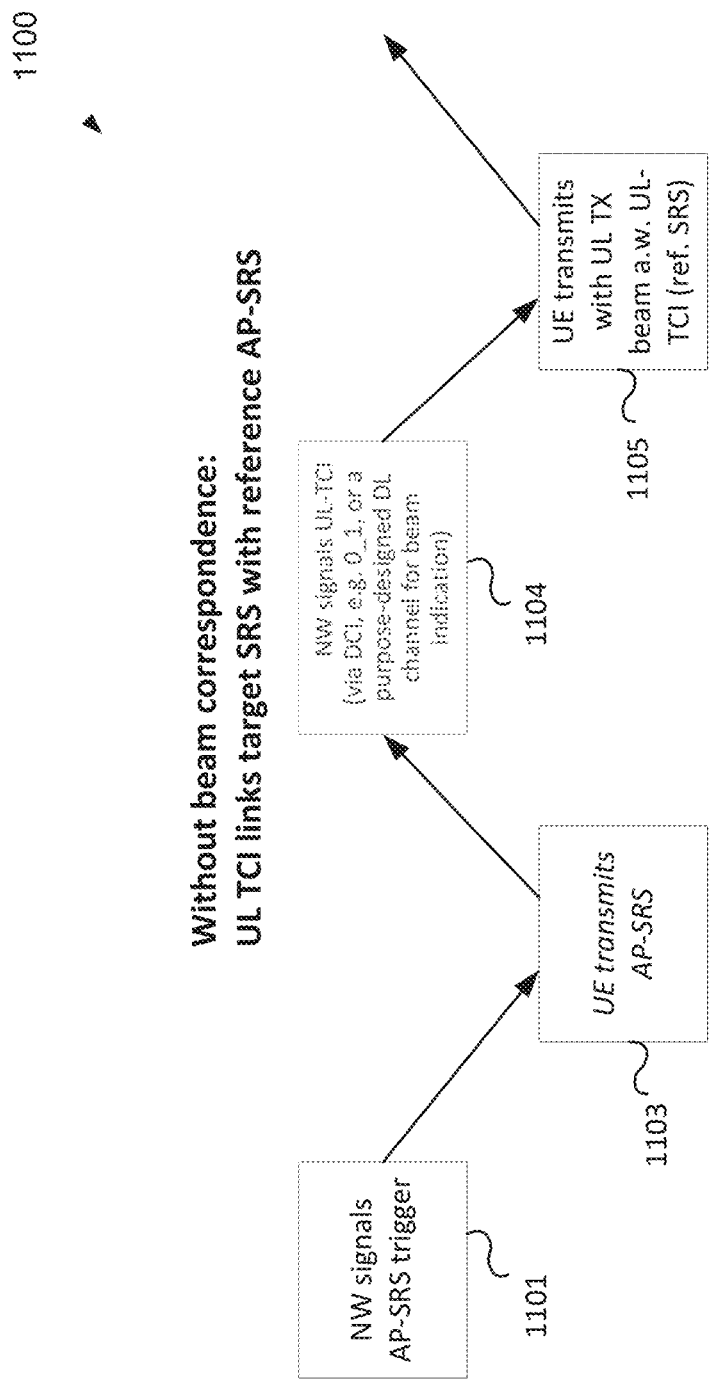
FIG. 11 illustrates another example UL multi-beam operation according to embodiments of the present disclosure.

FIG. 11 illustrates another example UL multi-beam operation 1100 according to embodiments of the present disclosure. An embodiment of the UL multi-beam operation 1100 shown in FIG. 11 is for illustration only.

As illustrated in FIG. 11 (embodiment B-2), an UL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select an UL TX beam for the UE.

The gNB/NW can then indicate the UL TX beam selection (step 1104) using the UL-TCI field or joint TCI field in the UL-related DCI (that carries the UL grant, such as DCI format 0_1 in NR). In this case, the UL-TCI indicates a reference RS (in this case, an AP-SRS) representing the selected UL TX beam. In addition, the UL-TCI can also indicate a "target" RS (e.g., SRS) that is linked to the reference RS (in this case, an AP-SRS). Upon successfully decoding the UL-related DCI with the UL-TCI or joint TCI, the UE performs UL transmission (such as data transmission on PUSCH) with the UL TX beam indicated by the UL-TCI or joint TCI (step 1105).

Alternatively, a gNB/NW can indicate the UL TX beam selection (step 1104) using an UL-TCI field or joint TCI field for the UE in a purpose-designed DL channel for beam indication. A purpose-designed DL channel for beam indication can be UE-specific or for a group of UEs. In this case, the UL-TCI or joint TCI indicates a reference RS (in this case, an AP-SRS) representing the selected UL TX beam. In addition, the UL-TCI or joint TCI can also indicate a "target" RS (e.g., SRS) that is linked to the reference RS (in this case, an AP-SRS). Upon successfully decoding a purpose-designed DL channel for beam indication with the UL-TCI or joint TCI, the UE performs UL transmission (such as data transmission on PUSCH) with the UL TX beam indicated by the UL-TCI or joint TCI (step 1105).

For this embodiment (B-2), the UE selects the UL TX beam from the reference RS (in this case SRS) index signaled via the UL-TCI field or joint TCI field.

In the above example embodiments, the DL and UL beam indication are separate (decoupled), i.e., the DL beam indication is based on DL-TCI indication and UL beam indication is based on UL-TCI. A joint TCI that couples DL and UL beam indications (either partially or fully) is provided. An example use case of the provided joint TCI indication can be a reciprocal system in which UL-DL beam correspondence holds.

A beam indication can correspond to a TCI-state, which indicates a target reference signal and one or more source reference signals with a QCL-Type for each. A beam indication can correspond to an SRS resource index, or to a spatial relation information.

A beam indication channel is transmitted after a NW/gNB has determined that channel conditions warrant using a new beam or beams. Alternatively, or additionally, a beam indication channel can be transmitted periodically to a UE to indicate a beam or beams the UE may be using.

Figure 12:
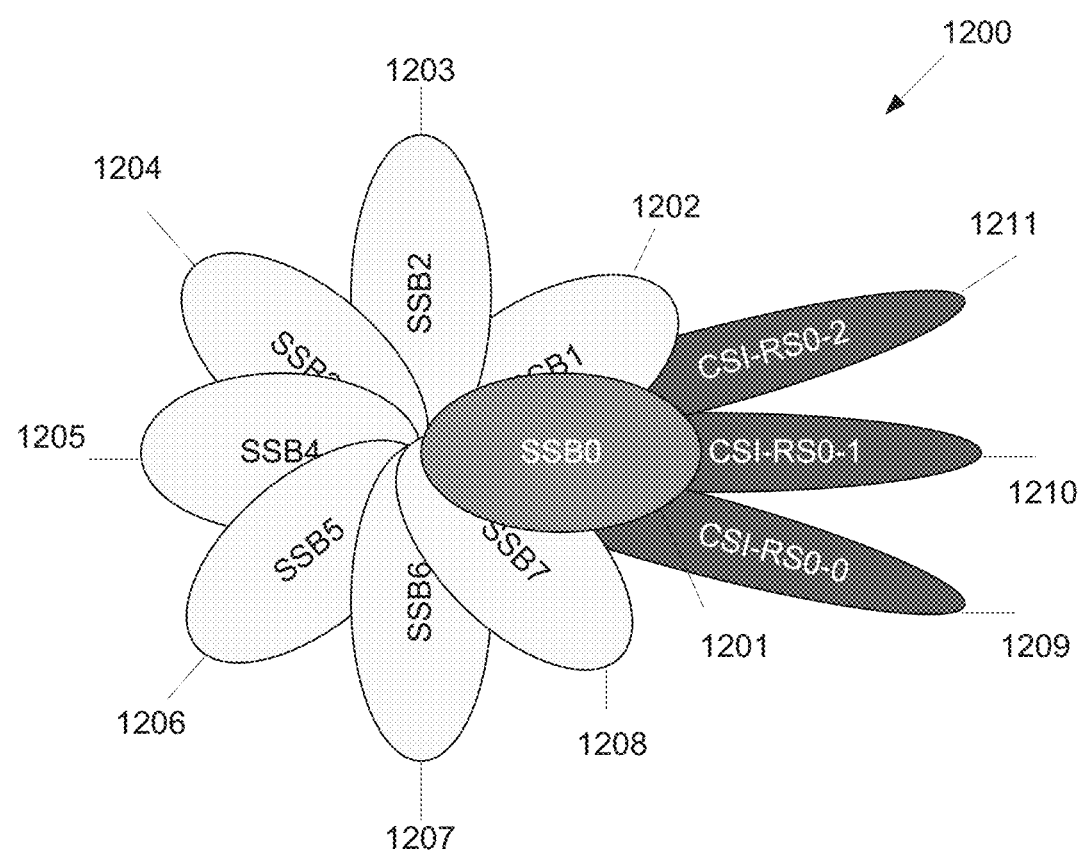
FIG. 12 illustrates an example cell coverage by N beams according to embodiments of the present disclosure.

FIG. 12 illustrates an example cell coverage by N beams 1200 according to embodiments of the present disclosure. An embodiment of the cell coverage by N beams 1200 shown in FIG. 12 is for illustration only.

FIG. 12 is an example of cell covered by N beams (1201 to 1208), each beam corresponds to a Synchronization Signal/PBCH Block (SSB) index, where an SSB index is transmitted using the spatial filter and/or TCI state of the corresponding beam. Each beam corresponding to an SSB can be further divided into narrower beams. For example, beam 1201 corresponding to SSB0, corresponds to M narrow beams (1209 to 1211), with M=3 in the example of FIG. 12.

Each narrow beam corresponds to a CSI-RS resource, where a CSI-RS resource is transmitted using the spatial filter and/or TCI state of a narrow beam. Through the TCI-state framework, an association is established between the reference signals (for example between the SSBs and CSI-RS resources). The association is established with respect to a quasi-co-location (QCL) type, e.g., QCL Type-D, which is with respect to the spatial Rx parameters.

Figure 13:
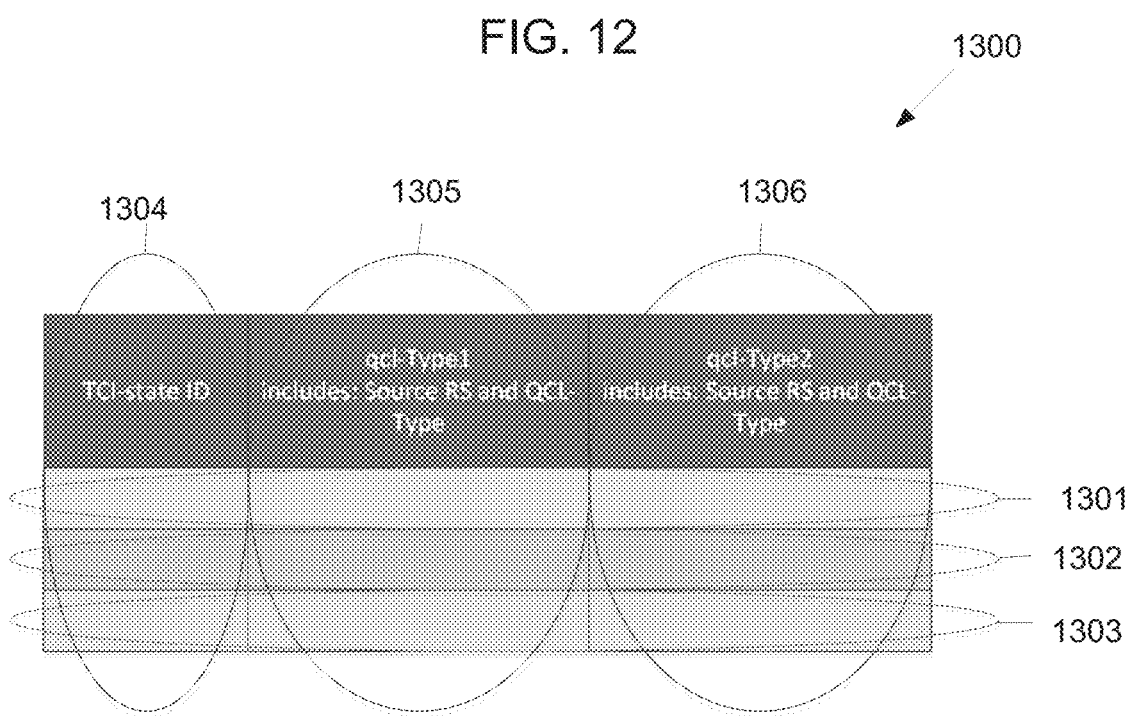
FIG. 13 illustrates an example TCI-state configuration according to embodiments of the present disclosure.

FIG. 13 illustrates an example TCI-state configuration 1300 according to embodiments of the present disclosure. An embodiment of the TCI-state configuration 1300 shown in FIG. 13 is for illustration only.

FIG. 13 is an example of the TCI-state configuration according to release 15 of 3GPP. A TCI-state configuration table contains a row for each TCI-state ID (1301, 1302, 1303). Each row contains a TCI-state ID (1304), QCL-Type1 (1305) and optionally QCL-Type2 (1306). Each QCL-Type includes a source reference signal and a QCL-Type, where the QCL-Type can be Type-A, Type-B, Type-C or Type-D. Each TCI-state can have at most 1 QCL-Type-D. A reference signal can be associated with another reference signal through a TCI-state ID. For example, in FIG. 12, CSI-RS0-0 (1209) can include a TCI-state with a source resource signal SSB0, and with QCL-Type-D.

In FIG. 12, beams corresponding to SSBs can be considered as level-0 beams, narrower-beams corresponding to CSI-RS, with a TCI-state having SSBs as source RS can be considered level-1 beams. Level-1 beams can include multiple narrower beams, each corresponding to CSI-RS, with a TCI-state having a level-1 CSI-RS as a source RS. These narrower beams can be considered level-2 beams. This hierarchical beam structure can continue to more levels.

Figure 14:
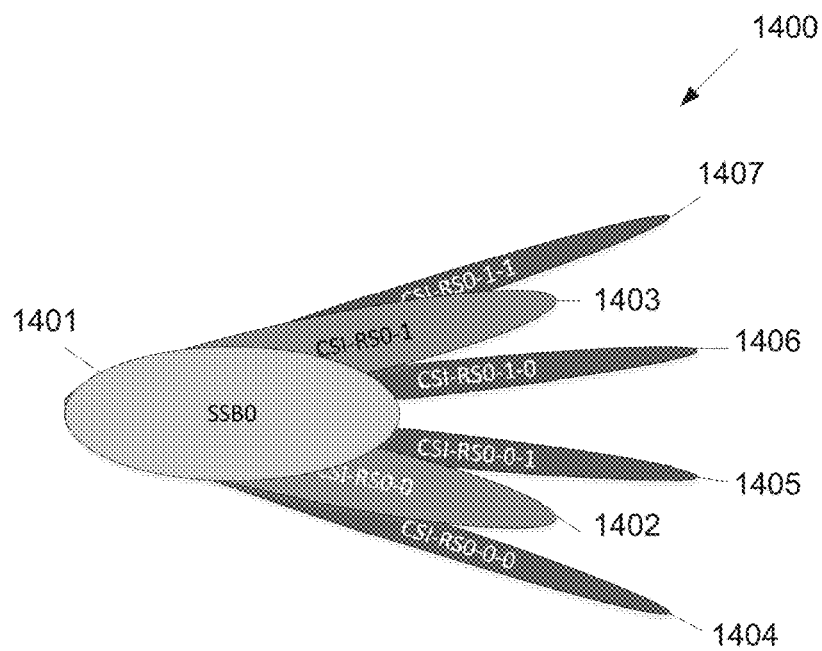
FIG. 14 illustrates an example hierarchical beam structure according to embodiments of the present disclosure.

FIG. 14 illustrates an example hierarchical beam structure 1400 according to embodiments of the present disclosure. An embodiment of the hierarchical beam structure 1400 shown in FIG. 14 is for illustration only.

As illustrated in FIG. 4, 1401 is a beam corresponding to SSB0, beam 1401, contains two beams (1402 and 1403) corresponding to CSI-RS0-0 and CSI-RS0-1 respectively. Beams 1402 and 1403 corresponding to CSI-RS0-0 and CSI-RS0-1 are level-1 CSI-RS beams. Beam 1402 contains two beams (1404 and 1405) corresponding to CSI-RS0-0-0 and CS-RS0-0-1 respectively. Similarly, beam 1403 contains two beams (1406 and 1407) corresponding to CSI-RS0-1-0 and CS-RS0-1-1 respectively. Beams 1404, 1405, 1406 and 1407 corresponding to CSI-RS0-0-0, CSI-RS0-0-1, CSI-RS0-1-0 and CSI-RS0-1-1 are level-2 CSI-RS beams. This hierarchical beam structure can continue to more levels.

A configuration of a data or a control channel in the downlink or uplink direction can include a TCI state with QCL-Type-D to a source reference signal. Through a hierarchical beam structure as illustrated in FIG. 14, association with an SSB or a lower-level CSI-RS resource can be established.

A configuration of a beam indication channel can include a TCI state with QCL-Type-D to a source reference signal. Through a hierarchical beam structure as illustrated in FIG. 14, association with an SSB or a lower-level CSI-RS can be established.

Figure 15:
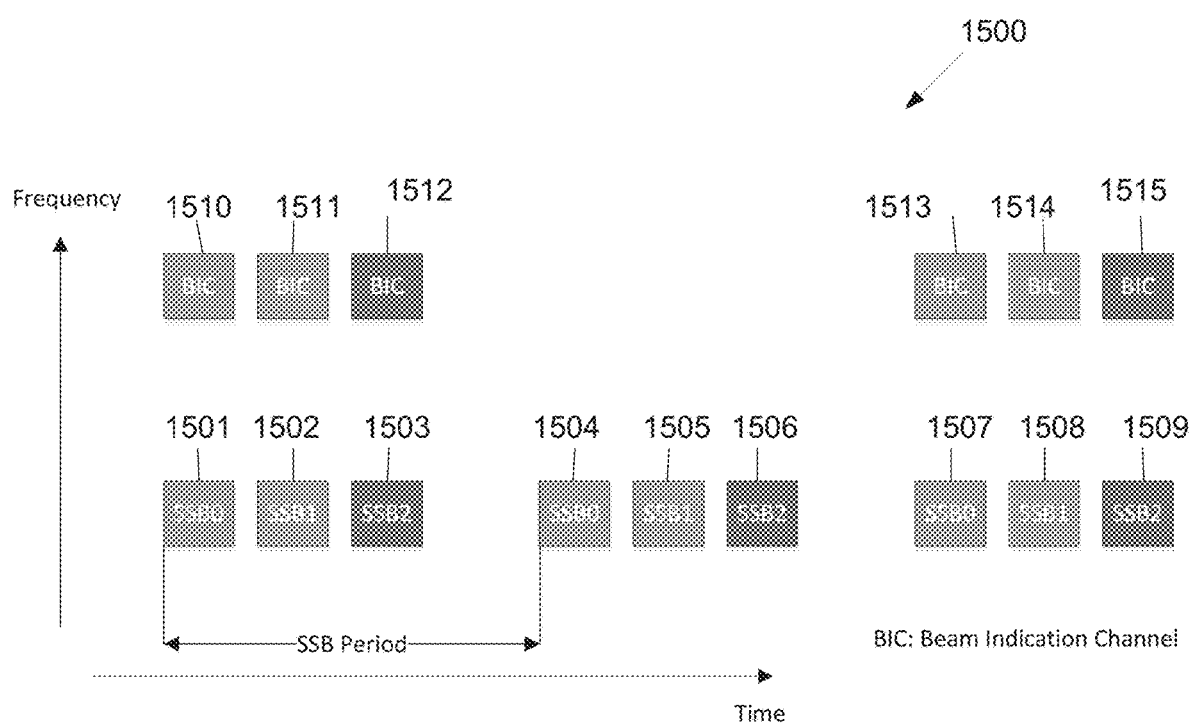
FIG. 15 illustrates an example relationship between an SSB and a beam indication channel according to embodiments of the present disclosure.

FIG. 15 illustrates an example relationship between an SSB and a beam indication channel 1500 according to embodiments of the present disclosure. An embodiment of the example relationship between an SSB and a beam indication channel 1500 shown in FIG. 15 is for illustration only.

As illustrated in FIGS. 15, 1501, 1504, and 1507 represent transmission occasions for SSB0. 1502, 1505, and 1508 represent transmission occasions for SSB1. 1503, 1506, and 1509 represent transmission occasions for SSB2. A beam indication channel 1510 and 1513 associated with SSB0 can be frequency division multiplexed with SSB0. A beam indication channel 1511 and 1514 associated with SSB1 can be frequency division multiplexed with SSB1. A beam indication channel 1512 and 1515 associated with SSB2 can be frequency division multiplexed with SSB2.

Figure 16:
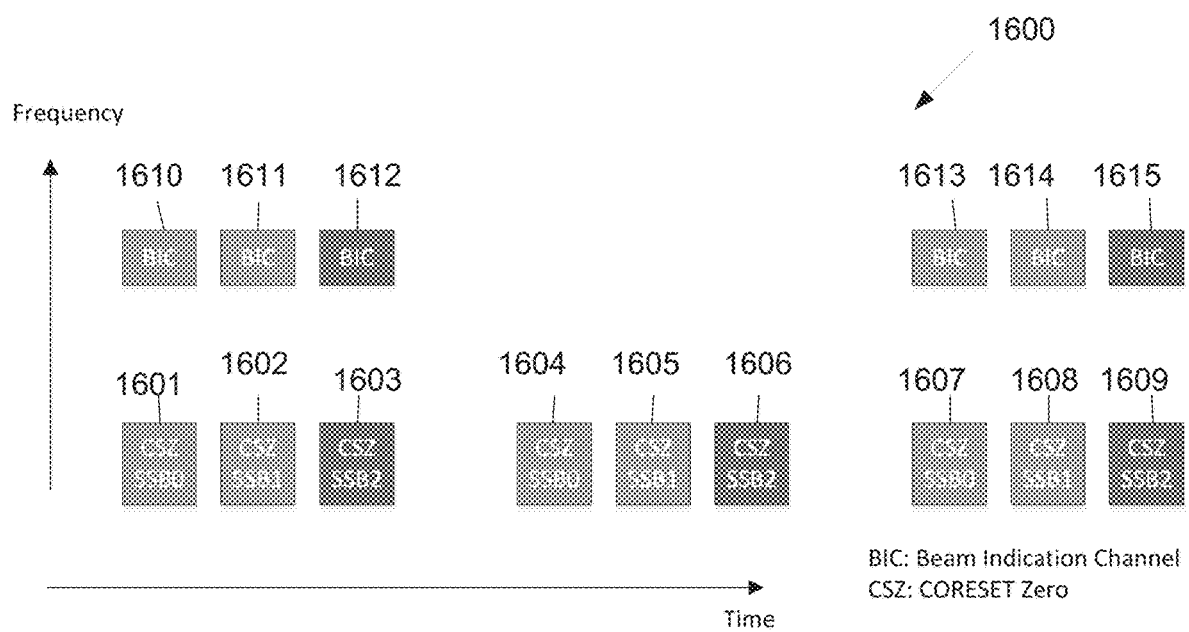
FIG. 16 illustrates an example relationship between CORESET0/SearchSpace0 and a beam indication channel according to embodiments of the present disclosure.

FIG. 16 illustrates an example relationship between CORESET0/SearchSpace0 and a beam indication channel 1600 according to embodiments of the present disclosure. An embodiment of the relationship between CORESET0/SearchSpace0 and a beam indication channel 1600 shown in FIG. 16 is for illustration only.

As illustrated in FIGS. 16, 1601, 1604, and 1607 represent monitoring occasions for Type0-PDCCH CSS associated with SSB0. 1602, 1605, and 1608 represent monitoring occasions for Type0-PDCCH CSS associated with SSB1. 1603, 1606, and 1609 represent monitoring occasions for Type0-PDCCH CSS associated with SSB2. A beam indication channel 1610 and 1613 associated with SSB0 can be frequency division multiplexed with monitoring occasion of CORESET0/Type0-PDCCH CSS for SSB0. A beam indication channel 1611 and 1614 associated with SSB1 can be frequency division multiplexed with monitoring occasion of CORESET0/Type0-PDCCH CSS for SSB1. A beam indication channel 1612 and 1615 associated with SSB2 can be frequency division multiplexed with monitoring occasion of CORESET0/Type0-PDCCH CSS for SSB2.

In one embodiment, Type0-PDCCH CSS (Common Search Space) can be search space zero.

Figure 17:
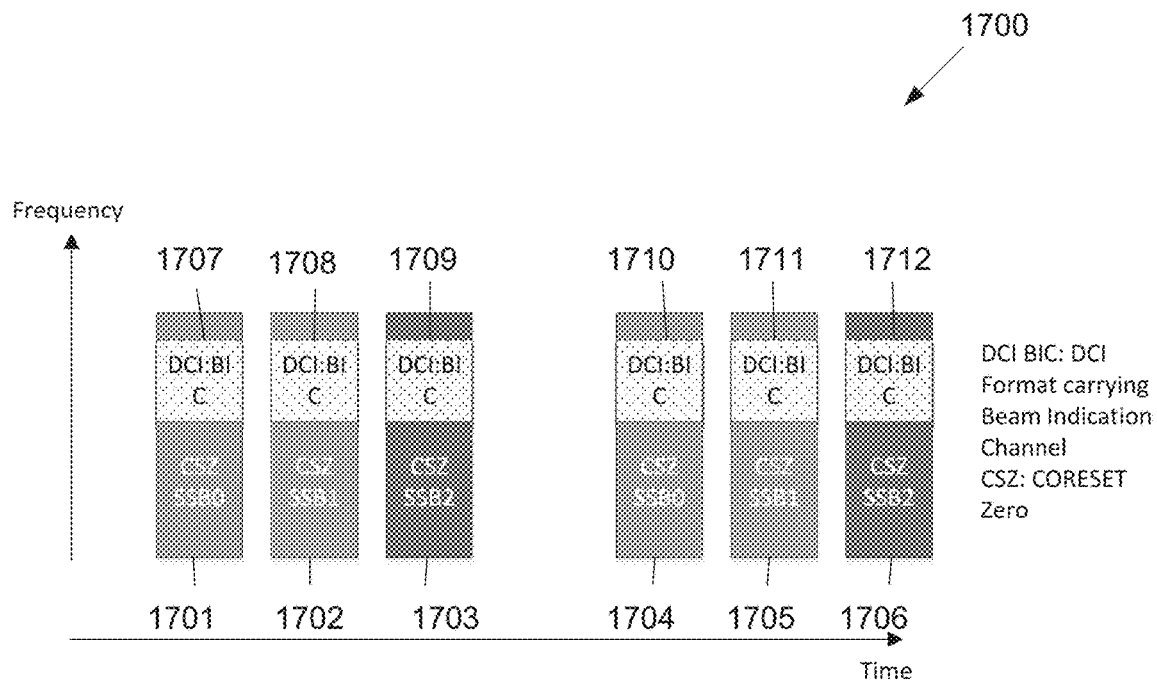
FIG. 17 illustrates another example relationship between CORESET0/SearchSpace0 and a beam indication channel according to embodiments of the present disclosure.

FIG. 17 illustrates another example relationship between CORESET0/SearchSpace0 and a beam indication channel according to embodiments of the present disclosure. An embodiment of the relationship between CORESET0/SearchSpace0 and a beam indication channel 1700 shown in FIG. 17 is for illustration only.

As illustrated in FIGS. 17, 1701 and 1704 represent monitoring occasions for Type0-PDCCH CSS associated with SSB0. 1702 and 1705 represent monitoring occasions for Type0-PDCCH CSS associated with SSB1. 1703 and 1706 represent monitoring occasions for Type0-PDCCH CSS associated with SSB2. A beam indication channel 1707 and 1710 associated with SSB0 can be a DCI Format in a monitoring occasion of CORESET0/Type0-PDCCH CSS for SSB0. A beam indication channel 1708 and 1711 associated with SSB1 can be a DCI Format in a monitoring occasion of CORESET0/Type0-PDCCH CSS for SSB1. A beam indication channel 1709 and 1712 associated with SSB2 can be a DCI Format in a monitoring occasion of CORESET0/Type0-PDCCH CSS for SSB2.

Figure 18:
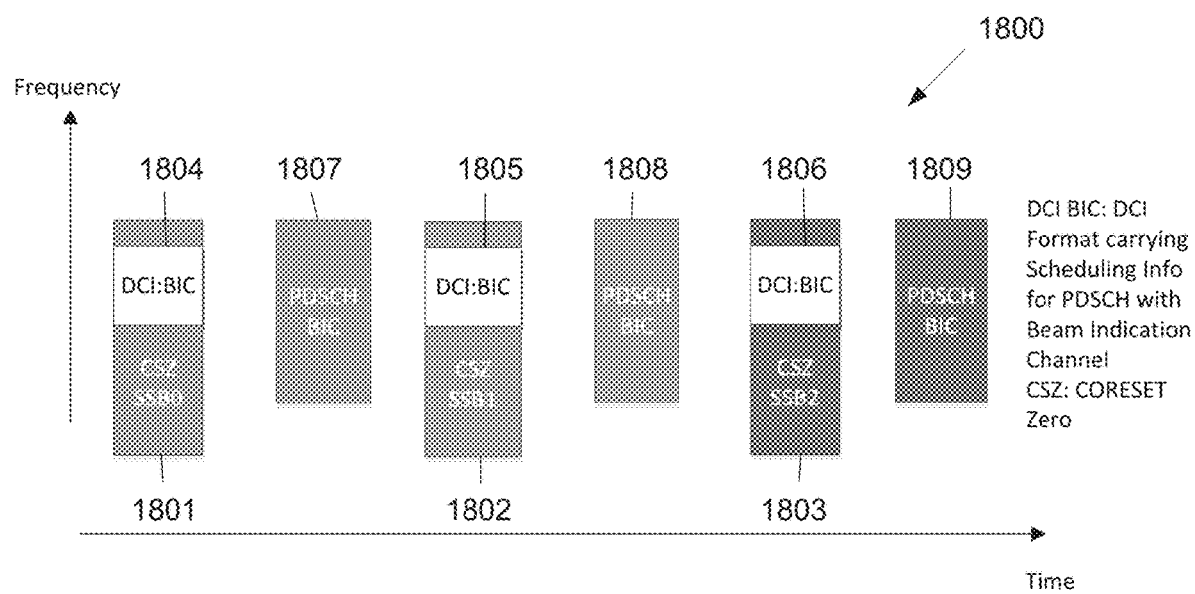
FIG. 18 illustrates another example relationship between CORESET0/SearchSpace0 and a beam indication channel according to embodiments of the present disclosure.

FIG. 18 illustrates another example relationship between CORESET0/SearchSpace0 and a beam indication channel 1800 according to embodiments of the present disclosure. An embodiment of the relationship between CORESET0/SearchSpace0 and a beam indication channel 1800 shown in FIG. 18 is for illustration only.

As illustrated in FIG. 18, 1801 represents monitoring occasions for Type0-PDCCH CSS associated with SSB0. 1802 represents monitoring occasions for Type0-PDCCH CSS associated with SSB1. 1803 represents monitoring occasions for Type0-PDCCH CSS associated with SSB2. A beam indication channel 1807 associated with SSB0 can be a PDSCH transmission scheduled by a DCI Format 1804 in a monitoring occasion of CORESET0/Type0-PDCCH CSS for SSB0. A beam indication channel 1808 associated with SSB1 can be a PDSCH transmission scheduled by a DCI Format 1805 in a monitoring occasion of CORESET0/Type0-PDCCH CSS for SSB1. A beam indication channel 1809 associated with SSB2 can be a PDSCH transmission scheduled by a DCI Format 1806 in a monitoring occasion of CORESET0/Type0-PDCCH CSS for SSB2.

Figure 19:
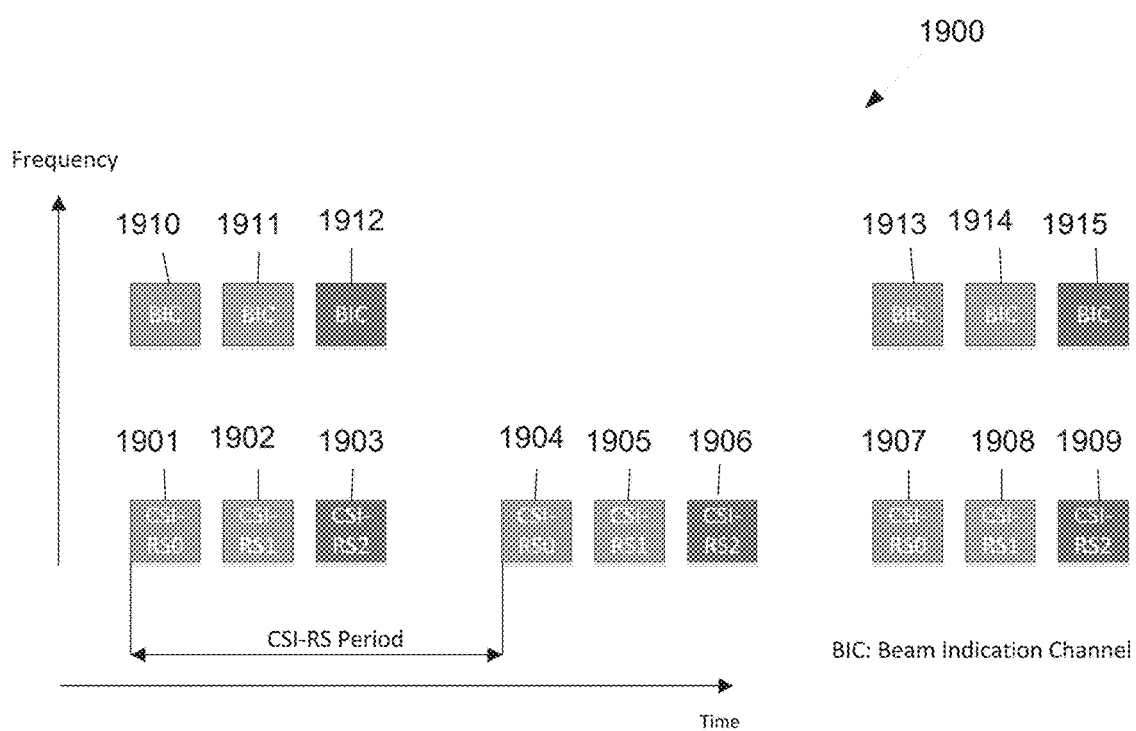
FIG. 19 illustrates an example relationship between a CSI-RS and a beam indication channel according to embodiments of the present disclosure.

FIG. 19 illustrates an example relationship between a CSI-RS and a beam indication channel 1900 according to embodiments of the present disclosure. An embodiment of the relationship between a CSI-RS and a beam indication channel 1900 shown in FIG. 19 is for illustration only.

As illustrated in FIGS. 19, 1901, 1904, and 1907 represent transmission occasions for CSI-RS resource 0. 1902, 1905, and 1908 represent transmission occasions for CSI-RS resource 1. 1903, 1906, and 1909 represent transmission occasions for CSI-RS resource 2. A beam indication channel 1910 and 1913 associated with CSI-RS resource 0 can be frequency division multiplexed with CSI-RS resource 0. A beam indication channel 1911 and 1914 associated with CSI-RS resource 1 can be frequency division multiplexed with CSI-RS resource 1. A beam indication channel 1912 and 1915 associated with CSI-RS resource 2 can be frequency division multiplexed with CSI-RS resource 2.

In one embodiment, SSB-based beams for beam indication is provided.

A beam indication channel can be transmitted using spatial filter and/or TCI state of a corresponding synchronization signal/PBCH Block (SSB).

In one example, a gNB can transmit a beam indication using a beam indication channel corresponding to an SSB that is QCL-TypeD with the beam indication.

In one example, a gNB can transmit a beam indication using beam indication channels corresponding to SSBs that are QCL-TypeD with the beam indications. In this example, a beam indication can correspond to multiple beams, for example in case of multi-TRP/multi-panel, or in case of transmission using more than one beam in a dispersive multi-path environment.

In one example, a gNB can transmit a beam indication using beam indication channels corresponding to a group of SSBs that are in the general direction of a UE.

In one example, a gNB can transmit a beam indication using beam indication channels corresponding to all SSBs of a cell.

In one example, a UE monitors a beam indication channel of an SSB with RSRP that exceeds a configured or pre-configured threshold.

In one example, a UE monitors a beam indication channel of all SSBs with RSRP that exceed a configured or pre-configured threshold.

In one embodiment, CSI-RS-based beams for beam indication is provided.

A gNB configures one or more set(s) of periodic CSI-RS resources that can be used for beam management. A beam indication channel can be transmitted using spatial filter and/or TCI state of a corresponding CSI-RS resource.

In one example, a gNB can transmit a beam indication using a beam indication channel corresponding to a CSI-RS resource that is QCL-TypeD with the beam indication.

In one example, a gNB can transmit a beam indication using beam indication channels corresponding to CSI-RS resources that are QCL-TypeD with the beam indications. In this example, a beam indication can correspond to multiple beams, for example in case of multi-TRP/multi-panel, or in case of transmission using more than one beam in a dispersive multi-path environment.

In one example, a gNB can transmit a beam indication using beam indication channels corresponding to a group of CSI-RS resources that are in the general direction of a UE.

In one example, a gNB can transmit a beam indication using beam indication channels corresponding to all CSI-RS resource of a CSI-RS resource set.

In one example, a gNB can transmit a beam indication using beam indication channels corresponding to all (or some of the) CSI-RS resources of a CSI-RS resource set, where the CSI-RS resource set includes a CSI-RS that is QCL-TypeD with the beam indication.

In one example, a gNB can transmit a beam indication using beam indication channels corresponding to all CSI-RS resources of all CSI-RS resource sets of a cell.

In one example, a UE monitors a beam indication channel of CSI-RS resource with RSRP that exceeds a configured or pre-configured threshold.

In one example, a UE monitors a beam indication channel of all CSI-RS resources with RSRP that exceeds a configured or pre-configured threshold in one CSI-RS resource set.

In one example, a UE monitors a beam indication channel of all CSI-RS resources with RSRP that exceeds a configured or pre-configured threshold across all CSI-RS resource sets.

In one example, a gNB may activate or deactivate CSI-RS resources and/or CSI-RS resource sets through MAC CE signaling.

In one example, a gNB may activate or deactivate CSI-RS resources and/or CSI-RS resource sets through L1 signaling.

In one example, a gNB configures or reconfigures CSI-RS resources and/or CSI-RS resource sets through higher layer RRC signaling.

In one example, a CSI-RS resource can be a semi-persistent CSI-RS resource.

In one embodiment, SSB-based CSI-RS-based beams for beam indication is provided.

A gNB configures one or more set(s) of periodic CSI-RS resources that can be used for beam management. A beam indication channel can be transmitted using spatial filter and/or TCI state of a corresponding SSB or a corresponding CSI-RS resource. The described embodiment/examples in the preset disclosure may be combined and applied the other described embodiments.

In one embodiment, transmission resources of beam indication channel is provided.

In one example, a beam indication channel is frequency division multiplexed with a SSB corresponding to the indicated beam. This is illustrated in the example of FIG. 15.

In one example, a beam indication channel can occupy some of the symbols of the SSB.

In one example, a beam indication channel can occupy all of the symbols of the SSB.

In one example, a beam indication can occupy additional symbols not occupied by the SSB.

In one example, a beam indication channel is frequency division multiplexed with an SSB that is QCL-Type D with a CSI-RS resource corresponding to the indicated beam. The association between an SSB and a CSI-RS resource can be established through a hierarchical relationship as illustrated in FIG. 14.

In one example, a beam indication channel can occupy some of the symbols of the SSB.

In one example, a beam indication channel can occupy all of the symbols of the SSB.

In one example, a beam indication can occupy additional symbols not occupied by the SSB.

In one example, a beam indication channel is frequency division multiplexed with a CSI-RS resource corresponding to the indicated beam. This is illustrated in the example of FIG. 19.

In one example, a beam indication channel can occupy some of the symbols of the CSI-RS resource.

In one example, a beam indication channel can occupy all of the symbols of the CSI-RS resource.

In one example, a beam indication can occupy additional symbols not occupied by the CSI-RS resource.

In one example, a beam indication channel is frequency division multiplexed with a CSI-RS that is QCL-Type D with a CSI-RS resource corresponding to the indicated beam. The association between two CSI-RS resources can be established through a hierarchical relationship as illustrated in FIG. 12.

In one example, a beam indication channel can occupy some of the symbols of the CSI-RS resource.

In one example, a beam indication channel can occupy all of the symbols of the CSI-RS resource.

In one example, a beam indication can occupy additional symbols not occupied by the CSI-RS resource.

In one example and the described examples in the present disclosure, a beam indication channel is transmitted every Nth occurrence of a candidate resource. Where N is an integer equal to or larger than 1. As illustrated in FIG. 15, a beam indication channel is transmitted every second occasion of an SSB index, in that example N=2.

In one example, a beam indication channel is frequency division multiplexed with CORESET Zero and search space zero of a SSB corresponding to the indicated beam. This is illustrated in FIG. 16. The overlapping in time of the beam indication channel with a monitoring occasion of CORESET ZERO, can be full overlap, partial overlap.

In one example, a beam indication channel is frequency division multiplexed with CORESET Zero and search space zero of an SSB that is QCL-Type D with a CSI-RS resource corresponding to the indicated beam. The association between an SSB and a CSI-RS resource can be established through a hierarchical relationship as illustrated in FIG. 12. The overlapping in time of the beam indication channel with a monitoring occasion of CORESET ZERO, can be full overlap, partial overlap.

In one example and the described examples in the present disclosure, a beam indication channel is transmitted every Nth occurrence of a candidate resource. Where N is an integer equal to or larger than 1. As illustrated in FIG. 16, a beam indication channel is transmitted every second occasion of a CORESET ZERO monitoring occasion associated with an SSB index, in that example N=2.

In one example, a beam indication channel is a PDCCH channel with DCI format in CORESET Zero and search space zero of a corresponding SSB. This is illustrated in FIG. 17.

In one example, a beam indication channel is a PDCCH channel with DCI format in CORESET Zero and search space zero of an SSB that is QCL-Type D with a CSI-RS resource corresponding to the indicated beam. The association between an SSB and a CSI-RS resource can be established through a hierarchical relationship as illustrated in FIG. 14.

In one example and the described examples in the present disclosure, a CORESET can be a CORESET configured for beam indication and/or a search space can be a search space configured for beam indication.

In one example and the described examples in the present disclosure, a CORESET can be a common CORESET or a UE-specific CORESET and/or a search space can be a common search space or a UE-specific search space.

In one example and the described examples in the present disclosure, a beam indication channel is transmitted every Nth occurrence of a candidate resource. Where N is an integer equal to or larger than 1.

In one example, a beam indication channel is a PDCCH channel with DCI format in a CORESET and search space configured and associated with a corresponding CSI-RS for beam indication.

In one example, a beam indication channel is a PDCCH channel with DCI format in a CORESET and search space configured and associated with a CSI-RS, for beam indication, that is QCL-Type D with a CSI-RS corresponding to the indicated beam. The association between two CSI-RS resources can be established through a hierarchical relationship as illustrated in FIG. 14.

In one example and the described examples in the present disclosure, a CORESET can be CORESET zero.

In one example and the described examples in the present disclosure, a search space can be search space zero.

In one example and the described examples in the present disclosure, a CORESET can be a common CORESET or a UE-specific CORESET and/or a search space can be a common search space or a UE-specific search space.

In one example and the described examples in the present disclosure, a beam indication channel is transmitted every Nth occurrence of a candidate resource. Where N is an integer equal to or larger than 1.

In one example, a CORESET can be configured for a group of UEs.

In one example, a search space can be configured for a group of UEs.

In one example, a CORESET can be configured based on association with multiple SSBs and/or multiple CSI-RS resources.

In one example, a search space can be configured based on association with multiple SSBs and/or multiple CSI-RS resources.

In one example, a beam indication channel is a PDSCH channel scheduled by DCI format in CORESET Zero and search space zero of a SSB corresponding to the indicated beam. This is illustrated in the example of FIG. 18.

In one example, a beam indication channel is a PDSCH channel scheduled by DCI format in CORESET Zero and search space zero of an SSB that is QCL-Type D with a CSI-RS resource corresponding to the indicated beam. The association between an SSB and a CSI-RS resource can be established through a hierarchical relationship as illustrated in FIG. 14.

In one example and the described examples in the present disclosure, a CORESET can be a CORESET configured for beam indication and/or a search space can be a search space configured for beam indication.

In one example and the described examples in the present disclosure, a CORESET can be a common CORESET or a UE-specific CORESET and/or a search space can be a common search space or a UE-specific search space.

In one example and the described examples in the present disclosure, a beam indication channel is transmitted every Nth occurrence of a candidate resource. Where N is an integer equal to or larger than 1.

In one example, a beam indication channel is a PDSCH channel scheduled by a DCI format in a CORESET and search space configured and associated with a corresponding CSI-RS for beam indication.

In one example, a beam indication channel is a PDSCH channel scheduled by a DCI format in a CORESET and search space configured and associated with a CSI-RS, for beam indication, that is QCL-Type D with a CSI-RS corresponding to the indicated beam. The association between two CSI-RS resources can be established through a hierarchical relationship as illustrated in FIG. 14.

In one example, beam indication can be included in the remaining minimum system information (RMSI), also known as SIB 1.

In one embodiment, a timing of beam indication channel is provided.

In one example, a beam indication channel to a UE and/or a group of UEs can be event triggered, a beam indication channel is transmitted when a gNB determines that a new beam may be used for communication to/from a UE.

In one example, a beam indication channel to a UE and/or a group of UEs can be transmitted periodically on configured time, frequency and/or code resources.

In one example, a beam indication channel to a UE or a group of UEs can be transmitted periodically on configured time, frequency and/or code resources, in addition a beam indication channel can be event triggered, when a gNB determines that a new beam may be used for communication to/from a UE.

In one example, periodic beam indication and event triggered beam indication are transmitted on a same set of beam indication channel(s) corresponding to SSBs and/or CSI-RS resources.

In one example, periodic beam indication and event triggered beam indication are transmitted on a different set of beam indication channel(s) corresponding to SSBs and/or CSI-RS resources.

In one embodiment, payload and resources of beam indication channel are provided.

In one example, a beam indication channel is UE-specific.

In one example a beam indication channel includes a DL TCI-state.

In one example, a beam indication channel includes an UL TCI-state.

In one example, a beam indication channel includes a DL TCI-state and/or an UL TCI-state and/or Joint TCI state.

In one example, a beam indication channel is transmitted on UE-specific time and/or frequency and/or code resources.

In one example, a beam indication channel has a CRC scrambled with a UE-specific radio network temporary identifier (RNTI).

In one example, a beam indication channel is a PDCCH channel with a DCI format.

In one example, a beam indication channel includes a UE ID.

In one example, a beam indication channel has a CRC scrambled with a beam indication RNTI.

In one example, a channel conveying a beam indication (e.g., a TCI state or a spatial relation indication) reuses a DCI format for scheduling PDSCH (e.g., DCI Format 1_0, or DCI Format 1_1 or DCI Format 1_2) and/or a DCI format for scheduling PUSCH (e.g., DCI Format 0_0, or DCI Format 0_1, or DCI Format 0_2), wherein the corresponding DCI Format does not include a DL assignment or an UL grant.

In one example, a CRC of a DCI Format conveying a beam indication, with no DL assignment and no UL grant, is scrambled with a UE specific RNTI such as C-RNTI or CS-RNTI or MCS-C-RNTI.

In one example, a CRC of a DCI Format conveying a beam indication, with no DL assignment and no UL grant, is scrambled with a UE specific RNTI for beam indication.

In one example, a CRC of a DCI Format conveying a beam indication, with no DL assignment and no UL grant, is scrambled with a UE group specific RNTI for beam indication.

In one example, some bits or fields of the DCI Format are set to a pre-defined value that indicates the DCI Format is for beam indication without DL assignment or UL grant. For example, for DCI Format 1_1 or DCI Format 1_2, the frequency domain resource assignment field can be set to: (1) all 0's for resource Allocation Type 0; (2) all 1's for resource Allocation Type 1; and/or (3) all 1's or all 0's in case of resource allocation of type dynamic switch.

The remaining bits or fields of the DCI Format can be repurposed for TCI state indication, for example to indicate one or more of: (1) DL TCI states; (2) UL TCI states; (3) joint UL/DL TCI states; and/or (4) separate DL TCI States and UL TCI States After indication of the one or more TCI states, if there are remaining bits or fields in the DCI format, these bits can be one of: (1) reserved, for example for future use; (2) set to pre-defined values; and/or (3) a combination of some bits reserved and some bits set to pre-defined values.

Figure 20:
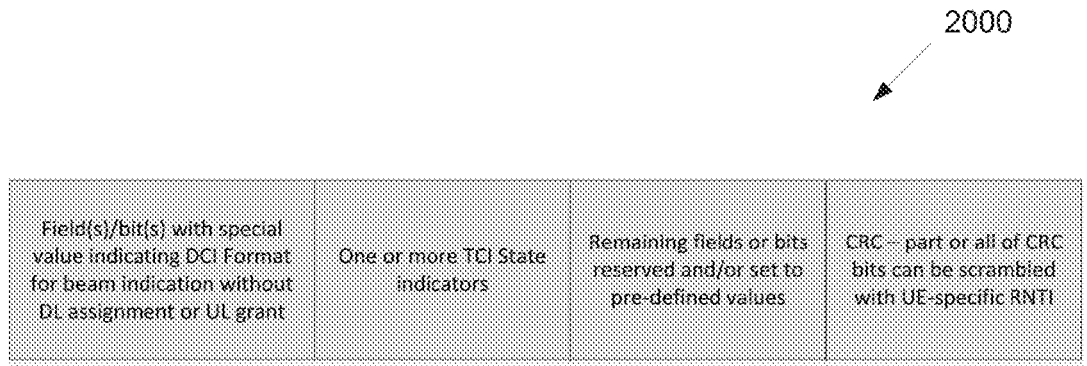
FIG. 20 illustrates example components of DCI format according to embodiments of the present disclosure.

FIG. 20 illustrates example components of DCI format 2000 according to embodiments of the present disclosure. An embodiment of the components of DCI format 2000 shown in FIG. 20 is for illustration only.

FIG. 20 is an example of the components of DCI Format (e.g., DCI Format 1_0, 1_1, 1_2, 0_0, 0_1 or 0_2) for conveying a beam indication with no DL assignment and no UL grant. The components of the DCI Format can include: (1) one or more fields or bits with a special value that indicate a DCI format for beam indication with no DL assignment and no UL grant; (2) one or more beam indicators (e.g., TCI states or spatial relation indications); (3) remaining fields or bits are reserved and/or set to pre-defined values; and/or (4) CRC with some or all bits scrambled with a UE-specific RNTI.

In one example, a field is added to the DCI Format, the field indicates if the DCI format indicates one or more TCI states without DL assignment or UL grant, or if the DCI Format is used for scheduling PDSCH or PUSCH or other usage as described in the specifications (e.g., SPS release, UL grant Type 2 release, SCell Dormancy). If the field indicates a beam indication (e.g., a TCI state or a spatial relation indication) is being conveyed in the DCI Format without a DL assignment or UL grant, the remaining bits or fields of the DCI Format can be repurposed for TCI state indication, for example to indicate one or more of: (1) DL TCI states; (2) UL TCI states; (3) joint UL/DL TCI states; and/or (4) separate DL TCI states and UL TCI states.

After indication of the one or more TCI states, if there are remaining bits or fields in the DCI format, these bits can be one of: reserved, for example for future use; set to pre-defined values; and/or a combination of some bits reserved and some bits set to pre-defined values.

Figure 21:
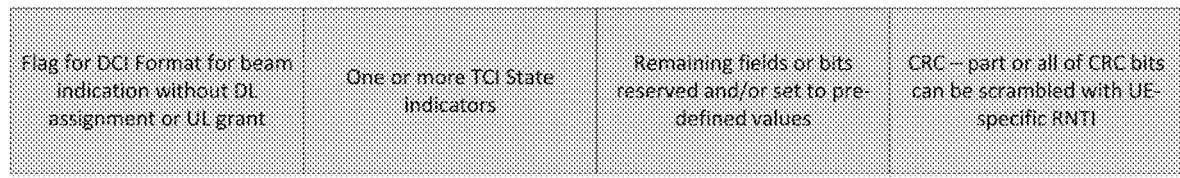
FIG. 21 illustrates another example component of DCI format according to embodiments of the present disclosure.

FIG. 21 illustrates another example component of DCI format 2100 according to embodiments of the present disclosure. An embodiment of the component of DCI format 2100 shown in FIG. 21 is for illustration only.

FIG. 21 is an example of the components of DCI Format (e.g., DCI Format 1_0, 1_1, 1_2, 0_0, 0_1 or 0_2) for conveying a beam indication with no DL assignment and no UL grant.

The components of the DCI Format can include: (1) a flag that indicates a DCI format for beam indication without DL assignment or UL grant (e.g., if flag doesn't indicate a DCI format for beam indication without DL assignment or UL grant, the remaining fields or bits are as defined for the corresponding DCI Format. Otherwise, the DCI Format is for beam indication without DL assignment or UL grant and the remaining fields or bits can be defined as described below); (2) one or more beam indicators (e.g., TCI states or spatial relation indications); (3) remaining fields or bits are reserved and/or set to pre-defined values; and/or (4) CRC with some or all bits scrambled with a UE-specific RNTI.

In one example, a UE can transmit HARQ-ACK feedback (e.g., on PUCCH or on PUSCH if PUCCH overlaps a PUSCH) in response to a DCI format conveying a beam indication (e.g., a TCI state or a spatial relation indication) without a DL assignment or an UL grant.

In one example, a channel conveying a beam indication (e.g., a TCI state or a spatial relation indication) reuses a DCI format for scheduling PDSCH (e.g., DCI Format 1_0, or DCI Format 1_1 or DCI Format 1_2) and/or a DCI format for scheduling PUSCH (e.g., DCI Format 0_0, or DCI Format 0_1, or DCI Format 0_2), wherein the corresponding DCI Format includes a DL assignment for dummy data (e.g., dummy PDSCH) or an UL grant for dummy data (e.g., dummy PUSCH).

In one example, a DCI format for scheduling PDSCH (e.g., DCI Format 1_0, or DCI Format 1_1 or DCI Format 1_2) includes a DL assignment for dummy data, and gNB does not transmit PDSCH, the UE doesn't attempt to decode PDSCH and assumes a positive HARQ_ACK to indicate to the gNB.

In one example, a DCI format for scheduling PDSCH (e.g., DCI Format 1_0, or DCI Format 1_1 or DCI Format 1_2) includes a DL assignment for dummy data, and gNB does not transmit PDSCH, the UE doesn't attempt to decode PDSCH and assumes a negative HARQ_ACK to indicate to the gNB.

In one example, a DCI format for scheduling PDSCH (e.g., DCI Format 1_0, or DCI Format 1_1 or DCI Format 1_2) includes a DL assignment for dummy data, and gNB does not transmit PDSCH, the UE attempts to decode PDSCH generates HARQ_ACK feedback based on the decoding result and indicates the HARQ_ACK status to the gNB.

In one example, a DCI format for scheduling PDSCH (e.g., DCI Format 1_0, or DCI Format 1_1 or DCI Format 1_2) includes a DL assignment for dummy data, and gNB transmits PDSCH, the UE does not attempt to decode PDSCH and assumes a positive HARQ_ACK to indicate to the gNB.

In one example, a DCI format for scheduling PDSCH (e.g., DCI Format 1_0, or DCI Format 1_1 or DCI Format 1_2) includes a DL assignment for dummy data, and gNB transmits PDSCH, the UE does not attempt to decode PDSCH and assumes a negative HARQ_ACK to indicate to the gNB.

In one example, a DCI format for scheduling PDSCH (e.g., DCI Format 1_0, or DCI Format 1_1 or DCI Format 1_2) includes a DL assignment for dummy data, and gNB transmits PDSCH, the UE attempts to decode PDSCH generates HARQ_ACK feedback based on the decoding result and indicates the HARQ_ACK status to the gNB.

In one example, a DCI format for scheduling PUSCH (e.g., DCI Format 0_0, or DCI Format 0_1 or DCI Format 0_2) includes a UL grant for dummy data, and UE does not transmit PUSCH.

In one example, the UE can transmit HARQ-ACK feedback (e.g., on PUCCH or on PUSCH if PUCCH overlaps a PUSCH) in response to the DCI format.

In one example, a DCI format for scheduling PUSCH (e.g., DCI Format 0_0, or DCI Format 0_1 or DCI Format 0_2) includes a UL grant for dummy data, and UE transmits PUSCH. In one instance, the UE can transmit HARQ-ACK feedback (e.g., on PUCCH or on PUSCH if PUCCH overlaps a PUSCH) in response to the DCI format. In another instance, the UE doesn't transmit HARQ-ACK feedback in response to the DCI format.

In one example, a CRC of a DCI Format conveying a beam indication, with DL assignment or UL grant for dummy data, is scrambled with a UE specific RNTI such as C-RNTI or CS-RNTI or MCS-C-RNTI.

In one example, a CRC of a DCI Format conveying a beam indication, with DL assignment or UL grant for dummy data, is scrambled with a UE specific RNTI for beam indication.

In one example, some bits or fields of the DCI Format are set to a pre-defined value that indicate if the DCI format includes a DL assignment or UL grant for dummy data or not. For example, a combination of special values for HARQ-ID and/or new data indicator and/or MCS and/or PUCCH resource indicator and/or PDSCH-to-HARQ feedback timing indicator can indicate that the DL assignment or UL grant is for dummy data.

In one example, a field is added to the DCI Format, the field indicates if the DCI format includes a DL assignment or UL grant for dummy data or not.

In one example, a DCI format for scheduling PDSCH (e.g., DCI Format 1_0, or DCI Format 1_1 or DCI Format 1_2) includes a DL assignment, and gNB transmits PDSCH. The PDSCH includes a DL shared channel with a special bit pattern (e.g., 0xAAAA . . . ) that indicates to the UE that this is dummy data that can be ignored.

In one example, a DCI format for scheduling PDSCH (e.g., DCI Format 1_0, or DCI Format 1_1 or DCI Format 1_2) includes a DL assignment, and gNB transmits PDSCH. The PDSCH includes a MAC CE indicating to the UE that this is dummy PDSCH that can be ignored.

In one example, DCI format for scheduling PUSCH (e.g., DCI Format 0_0, or DCI Format 0_1 or DCI Format 0_2) includes a UL grant for dummy data, and UE transmits PUSCH. The PUSCH includes an UL shared channel with a special bit pattern (e.g., 0xAAAA . . . ).

In one example, DCI format for scheduling PUSCH (e.g., DCI Format 0_0, or DCI Format 0_1 or DCI Format 0_2) includes a UL grant for dummy data, and UE transmits PUSCH. The PUSCH includes a MAC CE for a dummy PUSCH transmission.

In one example, a beam indication channel is to a group of UEs.

In one example, a beam indication channel includes a DL TCI-state of one or more UEs in a group.

In one example, a beam indication channel includes an UL TCI-state of one or more UEs in a group.

In one example, a beam indication channel includes a DL TCI-state and/or an UL TCI-state and/or Joint TCI state of one or more UEs in a group.

In one example, a UE ID of a DL TCI-state and/or an UL TCI-state and/or Joint TCI state is determined based on the order of the DL TCI-state and/or an UL TCI-state and/or Joint TCI state in the payload of the beam indication channel.

In one example, a beam indication channel includes a UE ID of one or more UEs in a group.

In one example, a beam indication channel is transmitted on UE-group-specific time and/or frequency and/or code resources In one example, a beam indication channel has a CRC scrambled with a UE-group-specific RNTI.

In one example, a beam indication channel is a PDCCH channel with a DCI format.

In one example, a beam indication channel includes a UE-group ID.

In one example, a beam indication channel has a CRC scrambled with a beam indication RNTI.

In one example, a beam indication channel is to UEs in a cell.

In one example, a beam indication channel includes a DL TCI-state of one or more UEs in a cell.

In one example, a beam indication channel includes an UL TCI-state of one or more UEs in a cell.

In one example, a beam indication channel includes a DL TCI-state and/or an UL TCI-state and/or Joint TCI state of one or more UEs in a cell.

In one example, a UE ID of a DL TCI-state and/or an UL TCI-state and/or Joint TCI state is determined based on the order of the DL TCI-state and/or an UL TCI-state and/or Joint TCI state in the payload of the beam indication channel.

In one example, a beam indication channel includes a UE ID of one or more UEs in a cell.

In one example, a UE ID of a DL TCI-state and/or an UL TCI-state and/or Joint TCI state is determined based on the time and/or frequency and/or code resources of a beam indication channel.

In one example, a beam indication channel has a CRC scrambled with a beam indication RNTI.

In one example, a beam indication channel is a PDCCH channel with a DCI format.

In one example, a beam indication channel is to UEs in a part of a cell.

In one example, a beam indication channel includes a DL TCI-state of one or more UEs in a part of a cell.

In one example, a beam indication channel includes an UL TCI-state of one or more UEs in a part of a cell.

In one example, a beam indication channel includes a DL TCI-state and/or an UL TCI-state and/or Joint TCI state of one or more UEs in a part of a cell.

In one example, a UE ID of a DL TCI-state and/or an UL TCI-state and/or Joint TCI state is determined based on the order of the DL TCI-state and/or an UL TCI-state and/or Joint TCI state in the payload of the beam indication channel.

In one example, a beam indication channel includes a UE ID of one or more UEs in a part of a cell.

In one example, a UE ID of a DL TCI-state and/or an UL TCI-state and/or Joint TCI state is determined based on the time and/or frequency and/or code resources of a beam indication channel.

In one example, a beam indication channel has a CRC scrambled with a beam indication RNTI.

In one example, a beam indication channel is a PDCCH channel with a DCI format.

In one example, a beam indication channel has a CRC scrambled with a cell-region specific beam indication RNTI In one embodiment, a channel structure of beam indication channel is provided.

In one example, the encoding of a payload of a beam indication channel follows the Polar encoding of NR control channels as described in LTE standard specification 38.212.

In one example, Polar encoding is used when the payload is greater than 11 bits.

In one example, a CRC is appended or prepended to the payload.

In one example, a CRC or part of a CRC is scrambled with an RNTI.

In one example, the encoding of payload of beam indication follows the encoding of small block length as described in TS 38.212, using a basis sequences as provided in TS 38.212.

In one example, small block length encoding is used when the payload is between 3 bits and 11 bits.

In one example, no CRC is added to the payload prior to encoding.

In one example, the beam indication channel is a pseudorandom sequence transmitted in one or more PRBs transmitted on one or more symbols.

In one example, the payload or part of the payload is used to initialize the pseudorandom sequence.

In one example, the payload or part of the payload is used to determine a frequency comb. For example, the pseudorandom sequence is transmitted every other subcarrier, and one bit is used to determine even or odd comb, or the pseudorandom sequence is transmitted every fourth subcarrier, and two bits are used to determine a comb.

In one example, the payload or part of the payload is used to determine a frequency domain orthogonal code cover.

In one example, the payload or part of the payload is used to determine a time domain orthogonal code cover.

In one example, the payload or part of the payload is used to determine a time domain symbol(s).

In one example, the payload or part of the payload is used to determine a frequency domain PRB(s).

In one example, some or all of the examples of the described examples in the present disclosure are used.

In one embodiment, an activation timing of beam indication channel is provided.

In one example, the beam(s) indicated by a beam indication channel is activated after a time specified in the specifications from the beam indication channel.

In one example, the beam(s) indicated by a beam indication channel is activated after a time specified in the specifications from the beam indication channel based on a UE capability.

In one example, the beam(s) indicated by a beam indication channel is activated after a time from the beam indication channel configured by higher layers.

In one example, the beam(s) indicated by a beam indication channel is activated after a time from the beam indication channel that depends on the sub-carrier spacing. The sub-carrier spacing can be that of the channel conveying the beam indication, the sub-carrier spacing of the active bandwidth part, the sub-carrier spacing of the active DL bandwidth part, the sub-carrier spacing of the active UL bandwidth part, the sub-carrier spacing of a bandwidth part to which the beam indication applies, the sub-carrier spacing of a DL bandwidth part to which the beam indication applies, the sub-carrier spacing of a UL bandwidth part to which the beam indication applies, the sub-carrier spacing of the one or more channels to which the beam indication applies, or the sub-carrier spacing is determined based on the previously mentioned sub-carrier spacing (e.g., the minimum or maximum sub-carrier spacing of some or all of the previously mentioned sub-carrier spacing values).

In one example, the configured time is signaled with cell-common signaling.

In one example, the configured time is signaled with UE-specific signaling.

In one example, the configured time is signaled with UE-group-specific signaling.

In one example, the configured time depends is determined by one or more of a sub-carrier spacing, a value(s) specified in the specifications, a signaled value(s) and a UE capability.

In one example, a UE transmits a positive acknowledgement after receiving a beam indication channel.

In one example, a UE transmits a positive acknowledgement after receiving a beam indication channel with a new beam.

In one example, a gNB receives/monitors a channel with acknowledgements for beam indication channels.

In one example, the beam(s) indicated by a beam indication channel is activated after a time specified in the specifications from the acknowledgement of the beam indication channel.

In one example, the beam(s) indicated by a beam indication channel is activated after a time specified in the specifications from the acknowledgement of the beam indication channel based on a UE capability.

In one example, the beam(s) indicated by a beam indication channel is activated after a time from the acknowledgement of the beam indication channel configured by higher layers.

In one example, the beam(s) indicated by a beam indication channel is activated after a time from the acknowledgement of the beam indication channel that depends on the sub-carrier spacing. The sub-carrier spacing can be that of the channel conveying the beam indication, the sub-carrier spacing of the active bandwidth part, the sub-carrier spacing of the active DL bandwidth part, the sub-carrier spacing of the active UL bandwidth part, the sub-carrier spacing of a bandwidth part to which the beam indication applies, the sub-carrier spacing of a DL bandwidth part to which the beam indication applies, the sub-carrier spacing of a UL bandwidth part to which the beam indication applies, the sub-carrier spacing of the one or more channels to which the beam indication applies, or the sub-carrier spacing is determined based on the previously mentioned sub-carrier spacing (e.g., the minimum or maximum sub-carrier spacing of some or all of the previously mentioned sub-carrier spacing values).

In one example, the configured time is signaled with cell-common signaling.

In one example, the configured time is signaled with UE-specific signaling.

In one example, the configured time is signaled with UE-group-specific signaling.

In one example, the configured time depends is determined by one or more of a sub-carrier spacing, a value(s) specified in the specifications, a signaled value and a UE capability.

In the present disclosure, additional aspects to further enhance the operational efficiency of beam indication by using 2-stage or 2-part beam indication are provided. A 2-stage/part beam indication comprises of a first stage/part beam indication and a second stage/part beam indication. Wherein, a first stage/part beam indication can be carried by a first channel with a light payload signal (e.g., in terms of number of payload bits), possibly with a lower processing requirement, that indicates to a UE or multiple UEs within a group of UEs whether beam indication information for the UE or the multiple UEs is included in a second stage/part beam indication carried by a second channel. Furthermore, as the first stage/part beam indication carried by a first channel is a light payload signal and the first stage/part beam indication can be sent over a wider beam than a second stage/part beam indication carried by a second channel, wherein, a beam for the second stage beam indication channel can be included in the first stage beam indication channel.

The present disclosure provides a 2-stage beam indication. A 2-stage beam indication comprises of a first stage beam indication carried on a first channel or signal and a second stage beam indication carried on a second channel or signal. Wherein, a first stage beam indication carried on a first channel is a light payload signal, possibly with a lower processing requirement, that indicates to a UE or multiple UEs within a group of UEs whether beam indication information for the UE or the multiple UEs is included in a second stage beam indication carried on a second channel. Furthermore, as the first stage beam indication carried on a first channel is a light payload signal and the first stage beam indication can be sent over a wider beam than a second stage beam indication carried on a second channel, wherein, a beam for the second stage beam indication channel can be included in the first stage beam indication channel.

Figure 22:
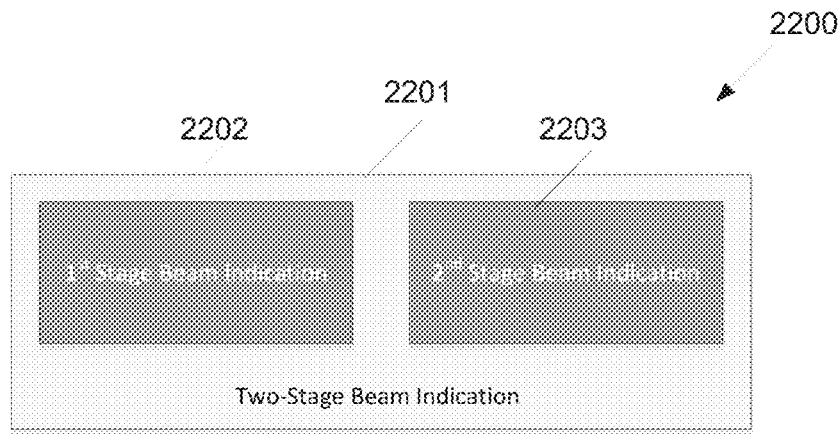
FIG. 22 illustrates an example two-stage beam indication according to embodiments of the present disclosure.

FIG. 22 illustrates an example two-stage beam indication 2200 according to embodiments of the present disclosure. An embodiment of the two-stage beam indication 2200 shown in FIG. 22 is for illustration only.

As illustrated in FIG. 22, a beam indication (2201) can comprise of two stages/parts. A first stage/part beam indication (2202) and a second stage beam indication (2203). Beam indication can be signaled using a channel/signal, wherein one channel is used for a first stage/part beam indication, and a second channel is used for a second stage/part beam indication. In one example, the second stage beam indication may be absent. When absent, the Tx beam does not change, and remains the same as the last reported Tx beam (e.g., indicated via the last reported second stage beam indication) or the Tx beam corresponds to a default beam.

In one embodiment, a beam indication structure is provided.

In one example, a beam indication is always two-stage/two-part.

In one example, a beam indication is one-stage/part or two-stage/part: (1) based on a fixed condition; e.g., depending on UE speed, locations etc.; (2) based on a configuration (e.g., via higher layer RRC signaling either implicitly using another parameter or explicitly using a separate parameter); and/or (3) based on a dynamic configuration update (e.g., via MAC-Layer signaling either implicitly using another parameter or explicitly using a separate parameter, or via Physical-Layer control signaling either implicitly using another parameter or explicitly using a separate parameter).

In one example, a first stage/part beam indication and a corresponding second stage/part beam indication channel can be sequential in time.

In one example, a physical channel carrying a first stage/part beam indication can start before a corresponding physical channel carrying a second stage/part beam indication, with the physical channel of the first stage/part beam indication channel and the corresponding physical channel of the second stage/part beam indication not overlapping in time.

In one example, a physical channel carrying a first stage/part beam indication can start before a corresponding physical channel carrying a second stage/part beam indication, with the physical channel carrying the first stage/part beam indication and the corresponding physical channel carrying the second stage/part beam indication partially overlapping in time.

In one example, a first stage/part beam indication and a corresponding second stage/part beam indication can be transmitted in parallel for example on different frequency resources.

In one example, a physical channel carrying a first stage/part beam indication and a corresponding physical channel carrying a second/part stage beam indication can start at the same time.

In one example, a physical channel carrying a first stage/part beam indication and a corresponding physical channel carrying a second stage/part beam indication can end at the same time.

In one example, a physical channel carrying a first stage/part beam indication and a corresponding physical channel carrying a second stage/part beam indication can partially or fully overlap in time.

In one embodiment, a first stage/part beam indication is provided.

In one example, a first stage/part beam indication can be included in a DL control channel, e.g., a PDCCH/DCI channel transmitted in search space and with a CORESET.

In one example, a UE monitors a PDCCH/DCI channel in a search space and with a CORESET that includes a first stage/part beam indication.

In one example, a search space for a PDCCH/DCI channel carrying a first stage/part beam indication is a common search space (CSS).

In one example, a search space for a PDCCH/DCI channel carrying a first stage/part beam indication is a UE specific search space (USS).

In one example, a search space for a PDCCH/DCI channel carrying a first stage/part beam indication is a UE-group specific search space.

In one example, a CORESET for a PDCCH/DCI channel carrying a first stage/part beam indication is a common CORESET.

In one example, a CORESET for a first stage PDCCH/DCI channel carrying a first stage/part beam indication is a UE specific CORESET.

In one example, a CORESET for a first stage PDCCH/DCI channel carrying a first stage/part beam indication is a UE group specific CORESET.

In one example, the PDCCH/DCI can be DL-related DCI, UL-related DCI or PDCCH/DCI providing other L1 control information to the UE.

In one example, a first stage/part beam indication can be included in a DL control channel, e.g., a PDCCH/DCI channel transmitted in multiple search spaces and/or with multiple CORESETs. Where the payload size can be different for each search space and/or CORESET.

In one example, a UE monitors a PDCCH/DCI channel in multiple search spaces and with multiple CORESETs that includes a first stage/part beam indication. The UE determines the payload size based on the search space and/or CORESET of the PDCCH/DCI channel detected that contains a first stage/part beam indication.

In one example, multiple search spaces for a PDCCH/DCI channel carrying a first stage/part beam indication are CSS.

In one example, multiple search spaces for a PDCCH/DCI channel carrying a first stage/part beam indication are USS.

In one example, multiple search spaces for a PDCCH/DCI channel carrying a first stage/part beam indication are UE-group specific search space.

In one example, multiple search spaces for a PDCCH/DCI channel carrying a first stage/part beam indication are a combination of at least two of the described examples in the present disclosure.

In one example, multiple CORESETs for a PDCCH/DCI channel carrying a first stage/part beam indication are common CORESETs.

In one example, multiple CORESETs for a first stage PDCCH/DCI channel carrying a first stage/part beam indication are UE specific CORESETs.

In one example, multiple CORESETs for a first stage PDCCH/DCI channel carrying a first stage/part beam indication are UE group specific CORESETs.

In one example, multiple CORESETs for a first stage PDCCH/DCI channel carrying a first stage/part beam indication are a combination of at least two of the described examples in the present disclosure.

In these examples, the PDCCH/DCI can be DL-related DCI, UL-related DCI or PDCCH/DCI providing other L1 control information to the UE.

In one example, a first stage/part beam indication (as illustrated in 2202 of FIG. 22) can be included in a reference signal.

In one example, a reference signal for a first stage/part beam indication can be transmitted in resources configured by higher layers.

In one example, a UE monitors a reference signal configured by higher layers for a first stage/part beam indication. Wherein resources include time/frequency and/or code resources.

In one example, resources for first stage/part beam indication can be configured by common/cell-specific higher layer signaling.

In one example, resources for first stage/part beam indication can be configured by UE specific higher layer signaling.

In one example, resources for first stage/part beam indication can be configured by UE-group specific higher layer signaling.

In one embodiment, a second stage/part beam indication is provided.

In one example, a second stage/part beam indication is a PDCCH/DCI transmitted in search space and with a CORESET.

In one example, a UE monitors a PDCCH/DCI channel carrying a second stage/part beam indication in a search space and with a CORESET after receiving a first stage/part beam indication indicating a presence of a PDCCH/DCI channel carrying a second stage/part beam indication.

In one example, a search space for a PDCCH/DCI channel carrying a second stage/part beam indication is a CSS.

In one example, a search space for a PDCCH/DCI channel carrying a second stage/part beam indication is a USS.

In one example, a search space for a PDCCH/DCI channel carrying a second stage/part beam indication is a UE-group specific search.

In one example, a CORESET for a PDCCH/DCI channel carrying a second stage/part beam indication is a common CORESET.

In one example, a CORESET for a PDCCH/DCI channel carrying a second stage/part beam indication is a UE specific CORESET.

In one example, a CORESET is for a PDCCH/DCI channel carrying a second stage/part beam indication is a UE group specific CORESET.

In such examples, the PDCCH/DCI can be DL-related DCI, UL-related DCI or PDCCH/DCI providing other L1 control information to the UE.

In one example, a PDCCH/DCI carrying a second stage/part beam indication in a monitoring occasion of a search space can have a fixed frequency offset from a physical channel carrying a first stage beam indication.

In such example, the frequency offset can be: (1) from the start frequency of the physical channel of the first stage/part beam indication to the start frequency of the PDCCH/DCI carrying the second stage/part beam indication; (2) from the start frequency of the physical channel of the first stage/part beam indication to the end frequency of the PDCCH/DCI carrying the second stage/part beam indication; (3) from the end frequency of the physical channel of the first stage/part beam indication to the start frequency of the PDCCH/DCI carrying the second stage/part beam indication; or (4) from the end frequency of the physical channel of the first stage/part beam indication to the end frequency of the PDCCH/DCI carrying the second stage/part beam indication. In some cases, the frequency offset can be zero.

In one example, a monitoring occasion and a time and/or frequency resource within a monitoring occasion for a PDCCH/DCI carrying a second stage/part beam indication can be indicated by a physical channel of the first stage beam indication.

In one example, a time and/or frequency resource for a PDCCH/DCI carrying a second stage/part beam indication in the described examples in the present disclosure can be indicated as a time and/or frequency offset relative to a physical channel of the first stage/part beam indication.

In one example, a time and/or frequency resource for a PDCCH/DCI carrying a second stage/part beam indication is configured by higher layers.

In one example, multiple search spaces and/or CORESET are configured for PDCCH/DCI carrying a second stage/part beam indication, wherein a search space and/or CORESET depends on a payload size indicated by a first stage/part beam indication. Furthermore, in some examples, the time and/or frequency for the channel carrying the second stage beam indication can be indicated as shown in the described examples in the present disclosure.

In one example, a DL control channel carrying a second stage/part beam indication is a PDCCH/DCI transmitted at fixed time and frequency offset relative to a physical channel of the first stage/part beam indication. This is illustrated in FIG. 23.

Figure 23:
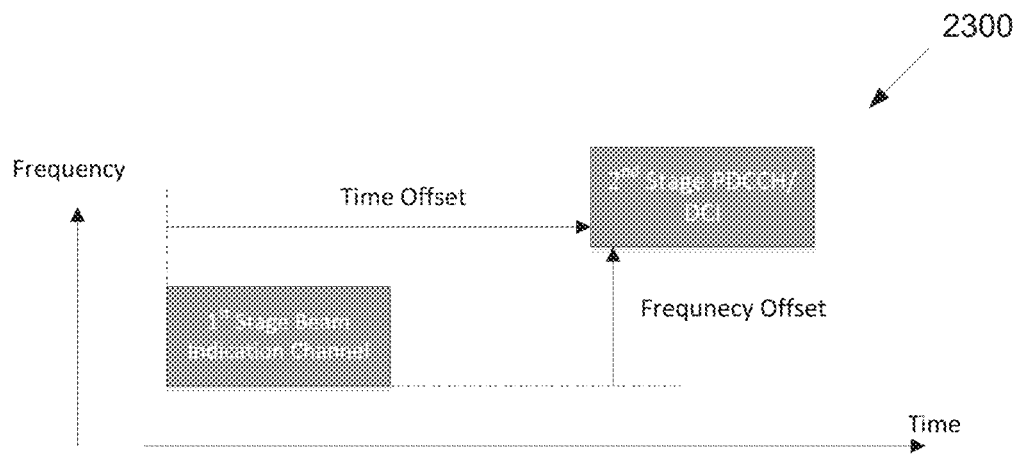
FIG. 23 illustrates an example time and frequency offset according to embodiments of the present disclosure.

FIG. 23 illustrates an example time and frequency offset 2300 according to embodiments of the present disclosure. An embodiment of the time and frequency offset 2300 shown in FIG. 23 is for illustration only.

In one example, a UE monitors and receives a PDCCH/DCI carrying a second stage/part beam indication at a fixed time and frequency offset relative to a physical channel of the first stage/part beam indication after receiving a first stage/part beam indication indicating a presence of PDCCH/DCI carrying a second stage/part beam indication.

In one example, a time and/or frequency offset is indicated in a first stage/part beam indication from a set of values configured by higher layers or specified in the standard.

In one example, the offset values can depend on the payload size of the first and/or second stage/part beam indication.

In one example, a time and/or frequency offset is configured by higher layers.

In one example, a time and/or frequency offset depends on the sub-carrier spacing, wherein the sub-carrier spacing is that of the first stage/part beam indication or the sub-carrier spacing of the second stage/part beam indication or a function (e.g. minimum of or maximum of) the sub-carrier spacing of the first stage/part beam indication and the second stage/part beam indication.

In one example, the offset values can depend on the payload size of the first and/or second stage/part beam indication.

In one example, a DL control channel carrying a second stage/part beam indication is a PDCCH/DCI transmitted in one of a plurality of resources configured by higher layers.

In one example, a UE monitors and receives a PDCCH/DCI carrying a second stage/part beam indication in a plurality of resources configured by higher layers after receiving a first stage/part beam indication indicating a presence of PDCCH/DCI carrying a second stage/part beam indication. In some instances, a UE can determine a resource for PDCCH/DCI carrying a second stage/part beam indication from a plurality of configured resources and then monitors and receives a PDCCH/DCI carrying a second stage/part beam indication.

In one example, a second stage/part beam indication is downlink control information (DCI) multiplexed with other downlink data on a PDSCH.

In one example, the number of resource elements (REs) allocated to the DCI carrying the second stage/part beam indication is determined based on at least some of the following, a configurable or dynamically indicated (in the first stage/part beam indication) beta offset, payload of second stage/part beam indication, payload of data multiplexed on PDSCH, (e.g., data of downlink share channel (DL-SCH)), modulation scheme of PDSCH, number of layers of PDSCH, number of resource blocks and symbols allocated to PDSCH and other signals multiplexed on PDSCH.

In one example, the data REs carrying DL-SCH are rate matched around the REs of DCI carrying the second stage/part beam indication.

In one example, the DCI REs carrying second stage/part beam indication puncture the data REs carrying DL-SCH.

In one example, the DCI REs carrying second stage/part beam indication avoid the PDSCH DM-RS REs.

In one example, DCI REs carrying second stage/part beam indication can be mapped to symbols near the PDSCH DM-RS symbols.

In one example, DCI REs carrying second stage/part beam indication can be not mapped to the PDSCH DM-RS symbols.

In one example, DCI REs carrying second stage/part beam indication can be mapped to the REs on the PDSCH DM-RS symbols not used for PDSCH DM-RS.

In one example, a second stage/part beam indication is part of the DL-SCH payload multiplexed on the PDSCH channel.

In one example, the PDSCH only carries the second stage/part beam indication.

In one example, the second stage/part beam indication channel is multiplexed with other data on the DL-SCH.

In one example, the second stage/part beam indication channel is a MAC Control Element (MAC CE) in the DL-SCH.

In one embodiment, a content of first stage/part beam indication is provided.

In one example, a first stage/part beam indication addressed to a group of UEs can include a bitmap, where each UE in the group of UEs being addressed by the beam indication has a corresponding bit. Each bit corresponding to a UE indicates the presence or absence of beam indication information (e.g., TCI state) for the UE in the second stage/part beam indication. This is illustrated in FIG. 24.

Figure 24:
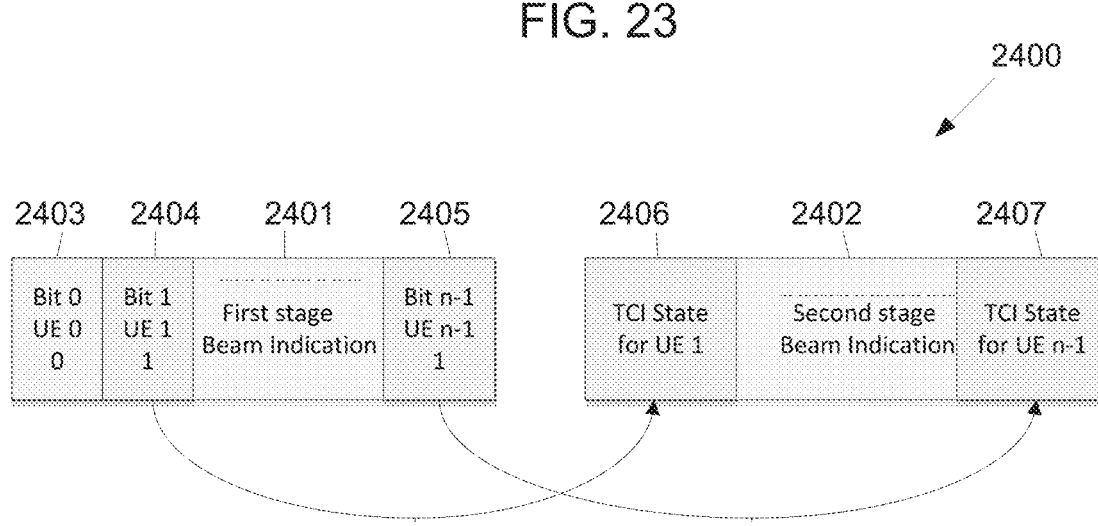
FIG. 24 illustrates an example beam indication according to embodiments of the present disclosure.

FIG. 24 illustrates an example beam indication 2400 according to embodiments of the present disclosure. An embodiment of the beam indication 2400 shown in FIG. 24 is for illustration only.

As illustrated in FIG. 24, first stage/part beam indication (2401) contains bits for each UE in a group of size "n", indicated by bit 0 for UE 0 (2403), bit 1 for UE 1 (2404), . . . Bit n−1 for UE n−1 (2405). In this example, bit 0 (2403) has a value of 0, bit 1 (2404) has a value of 1 and bit n−1 for UE n−1 (2405) has a value of 1.

The second stage/part beam indication (2402) includes beam indications (e.g., TCI states) for UEs that have the corresponding bit set to 1 in the first stage/part beam indication (2401). In this example, the second stage/part beam indication (2402) includes beam indications (e.g., TCI states) for a TCI state for UE 1 (2406) and a TCI state for UE n−1 (2407)

In one example, a first stage/part beam indication can include the type of beam indication information in the second stage/part beam indication. Where the type of beam indication information can be DL TCI-state and/or UL TCI-state and/or Joint TCI state.

In one example, a first stage/part beam indication can include the beam (i.e., spatial filter or TCI-state) used for the transmission of the physical channel carrying the second stage/part beam indication.

In one example, a UE upon receiving a first stage/part beam indication with a beam ID, spatial filter ID or TCI-state, receives a physical channel carrying a corresponding second stage/part beam indication with the assumption of the beam ID, spatial filter ID or TCI state ID indicated in the first stage/part beam indication.

In one example, a first stage/part beam indication can be a presence indicator indicating the presence of the second stage/part beam indication.

In one example, a UE upon receiving a first stage/part beam indication with a presence indicator, receives a second stage/part beam indication.

In one example, a presence indicator can be indicated, by the presence (i.e., detection) of a channel/signal carrying a first stage/part beam indication, a RNTI scrambling the CRC used in a physical channel carrying the first stage/part beam indication, a scrambling sequence of signal/channel carrying the first stage/part beam indication or a field within a physical channel carrying a first stage beam indication.

In one example, a first stage/part beam indication can be carried by a physical channel having a CRC field that is scrambled by an RNTI.

In one example, the RNTI can be a beam indication specific RNTI.

In one example, the RNTI can be a UE-group specific RNTI.

In one example, some or all of the previous fields can be included in or indicated by a physical channel carrying a first stage/part beam indication.

In one example, the first stage/part beam indication can include an indicator I indicating the presence/absence of Tx beam(s) for a multi-panel UE equipped with Z>1 antenna panels. In one example, the indicator I is a bitmap of length Z, wherein bit $b_i$ of the bitmap is associated with an i-th antenna panel at the UE. When bit $b_i=1$, the Tx beam for the i-th antenna panel is indicated via the second stage/part beam indication. When bit $b_i=0$, the Tx beam for the i-th antenna panel is not indicated.

In one example, the indicator I corresponds to (is associated with) the panel-Ids of the Z antenna panels.

In one example, a first stage/part beam indication is to a group of n UEs with an indicator l of length Z for each UE. In this case, the bitmap is of size n×Z bits.

In one example, a first stage/part beam indication is to a group of n UEs with an indicator l of length Z(i) for each UE, where Z(i) is the number of bits allocated to UE i, with i between 1 and n. In this case the bitmap is of size $$\sum_{i=1}^{n} Z(i)$$

bits

In one example, the first stage/part beam indication can include an indicator I indicating the presence/absence of Tx beam(s) for multi-panel/multi-TRPs. In one example, the indicator I is a bitmap of length Z, wherein bit $b_i$ of the bitmap is associated with an i-th antenna panel/TRP. When bit $b_i=1$, the Tx beam for the i-th antenna panel/TRP is indicated via the second stage/part beam indication. When bit $b_i=0$, the Tx beam for the i-th antenna panel/panel is not indicated.

In one example, a first stage/part beam indication is to a group of n UEs with an indicator l of length Z for each UE. In this case, the bitmap is of size n×Z bits.

In one example, the first stage/part beam indication channel/signal can include an indication about the presence/absence of other parameters (other than Tx beam indication). For example, for UL beam indication, the first stage/part beam indication can include an indication about the presence/absence of UL related parameters such power control, timing advance etc., which could be panel-specific (one parameter independently for each panel) or panel-common (one parameter common for all panels).

In one example, the payload of the first stage/part beam indication can vary. This requires a UE to preform multiple decode hypothesis of the physical channel(s) carrying the first stage/part beam indication.

In one example, different physical resources are used for the physical channel carrying the first stage/part beam indication.

In one example, same or partially overlapping physical resources are used for the physical channel carrying the first stage/part beam indication.

In one embodiment, a content of second stage/part beam indication is provided.

In one example, a second stage/part beam indication contains beam indication(s) for a UE or UEs indicated in a corresponding first stage beam indication. Where a beam indication can be a DL TCI-state and/or an UL TCI-state and/or a joint TCI-state.

In one example, a type of beam indication included in a second stage/part beam indication can be indicated in a first stage/part beam indication.

In one example, beam indication(s) e.g., DL TCI-state and/or an UL TCI-state and/or a joint TCI-state are configured by higher layers, and the second stage/part beam indication contains an index to a configured value.

In one example, a second stage/part beam indication contains a time offset for the application of the beam indication(s).

In one example, beam time-offsets are configured by higher layers, and the second stage/part beam indication contains an index to a configured time-offset.

In one example, a second stage/part beam indication can include beam indications for an antenna panel or antenna panels indicated in a corresponding first stage/part beam indication. Where a beam indication can be a DL TCI-state and/or an UL TCI state and/or a joint TCI state.

In one example, a type of beam indication for an antenna panel included in a second stage/part beam indication can be indicated in a first stage/part beam indication.

In one example, beam indication(s) e.g., DL TCI-state and/or an UL TCI-state and/or a joint TCI-state are configured by higher layers, and the second stage/part beam indication contains an index to a configured value.

In one example, a second stage/part beam indication can include beam indications for an antenna panel/UE pair(s) indicated in a corresponding first stage/part beam indication.

In one example, a second stage/part beam indication can include beam indications for multi-panel/multi-TRPs indicated in a corresponding first stage/part beam indication. Where a beam indication can be a DL TCI-state and/or an UL TCI state and/or a joint TCI state.

In one example, a type of beam indication for a multi-panel/multi-TRP included in a second stage/part beam indication can be indicated in a first stage/part beam indication.

In one example, beam indication(s) e.g., DL TCI-state and/or an UL TCI-state and/or a joint TCI-state are configured by higher layers, and the second stage/part beam indication contains an index to a configured value.

In one example, a second stage/part beam indication can include beam indications for a TRP/panel/UE group(s) indicated in a corresponding first stage/part beam indication.

In one example, a second stage/part beam indication can include parameters (other than Tx beam indication) whose presences is indicated in a corresponding first stage/part beam indication. For example, parameters such power control, timing advance etc., which could be panel-specific (one parameter independently for each panel) or panel-common (one parameter common for all panels) can be indicated in a second stage/part beam indication.

In one embodiment, a beam indication channel is provided.

In one example, a first stage/part beam indication is a first stage beam indication channel/signal (2202 of FIG. 22), and a second stage/part beam indication is a second stage beam indication channel/signal (2203 of FIG. 22).

In one example, a first stage beam Indication channel/signal (2202 of FIG. 22) is a first DL control channel, and a second stage beam indication channel/signal (2203 of FIG. 22) is a second DL control channel.

In one example, a first stage beam indication channel/signal (2202 of FIG. 22) is a reference signal, and a second stage beam indication channel/signal (2203 of FIG. 22) is a DL control channel.

In one example, a first stage beam indication channel/signal (2202 of FIG. 22) is a DL control channel, and a second stage beam indication channel/signal (2203 of FIG. 22) is downlink control information multiplexed in a physical downlink shared channel (PDSCH).

In one example, a first stage beam indication channel/signal (2202 of FIG. 22) is a DL control channel, and a second stage beam indication channel/signal (2203 of FIG. 22) is a downlink data channel.

Figure 25:
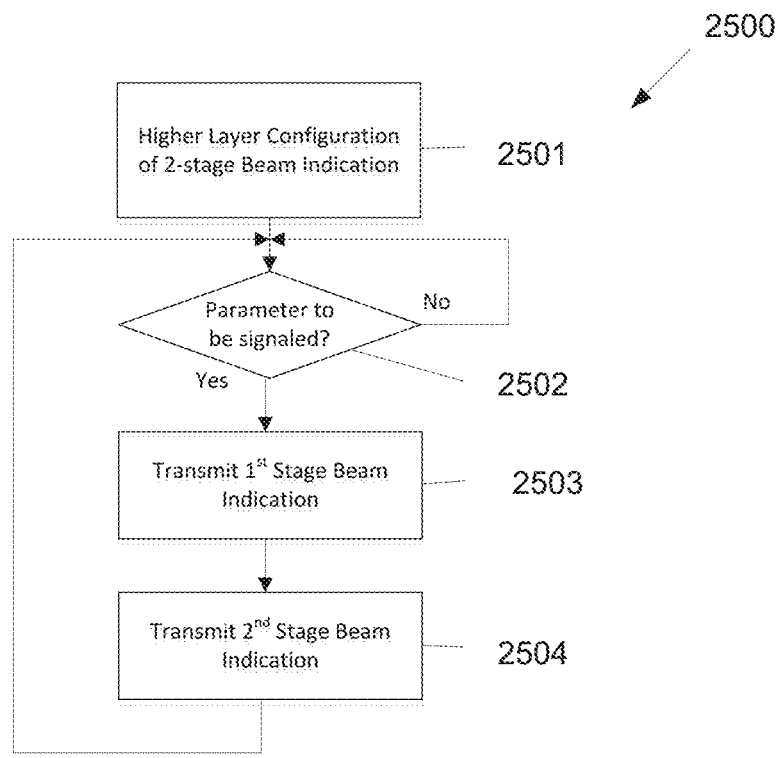
FIG. 25 illustrates a flowchart of a method of a gNB for beam processing according to embodiments of the present disclosure.

FIG. 25 illustrates a flowchart of a method 2500 of a gNB for beam processing according to embodiments of the present disclosure. An embodiment of the method 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions.

As illustrated in FIG. 25, in step 2501, higher layers configure two stage/part beam indication. Example of configuration includes: (1) resource allocation for physical channels used to carry the first stage/part beam indication and the second stage/part beam indication, including any potential mapping between the resource allocation of the physical channel of the first stage/part beam indication and the physical channel of the second stage/part beam indication; (2) parameters to indicate using two stage/part beam indication; (3) a number of UEs in a group of UEs using a two stage/part beam indication; (4) mapping of UEs/TRPs/antenna panels to corresponding bits in a first stage/part beam indication; and/or (5) other configuration parameters following the examples given in this disclosure.

The higher layer configuration of two stage/part beam indication can be using common/cell-specific signaling and/or UE specific signaling and/or UE-group specific signaling. Furthermore, some of the configuration parameters can be updated using RRC signaling, MAC-Layer signaling and/or physical layer control signaling.

In step 2502, a gNB decides if a parameter signaled by the two-stage/part beam indication may be signaled. A parameter can be for example, a beam, a TPC command, a TA, power control parameters, etc. If yes, proceed to step 2503, if no remain in step 2502.

In step 2503, a gNB transmits a first stage/part beam indication that indicates a UE and/or panel and/or TRP for which a parameter is being indicated in the second stage/part beam indication.

In step 2504, a gNB transmits a second stage/part beam indication that includes parameters whose presences is indicated in the corresponding first stage/part beam indication. Then proceed to step 2502.

For illustrative purposes the steps of this algorithm are described serially, however, some of these steps may be performed in parallel to each other.

Figure 26:
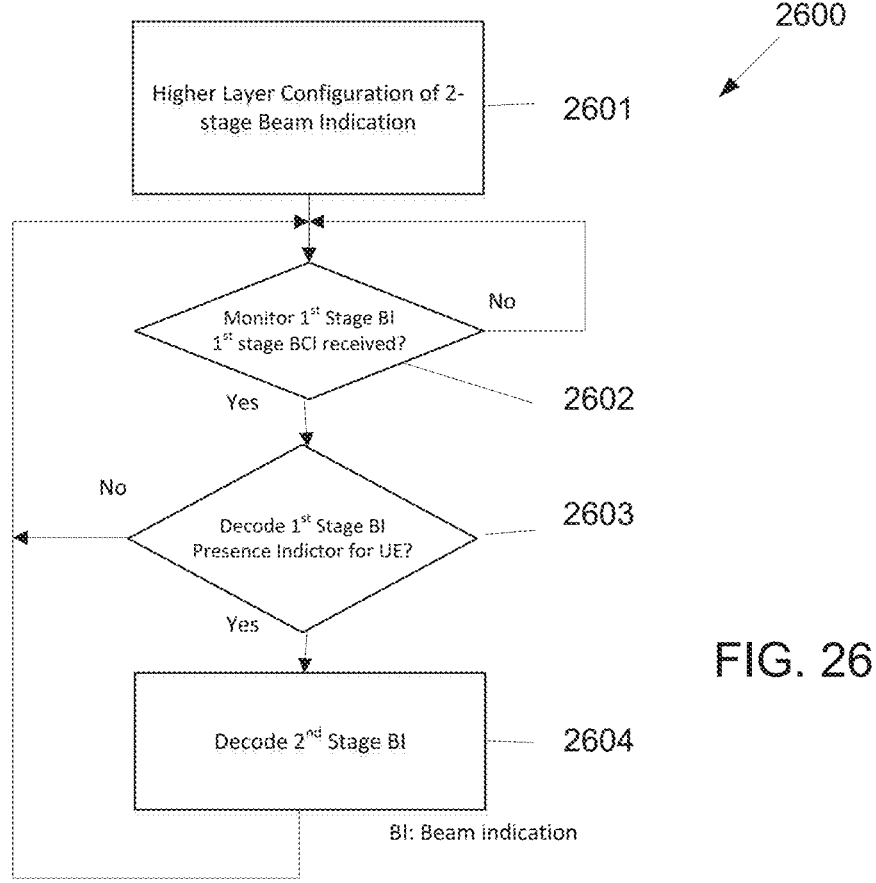
FIG. 26 illustrates a flowchart of a method of a UE for beam processing according to embodiments of the present disclosure.

FIG. 26 illustrates a flowchart of a method 2600 of a UE for beam processing according to embodiments of the present disclosure. An embodiment of the method 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions.

As illustrated in FIG. 26, in step 2601, higher layers configure a UE for two-stage/part beam indication. Example of configuration include: (1) resource allocation for physical channels of first stage/part beam indication and second stage/part beam indication, including any potential mapping between the resource allocation of the physical channel of the first stage/part beam indication and the physical channel of the second stage/part beam indication; (2) parameter(s) to indicate using two stage/part beam indication; (3) a number of UEs in a group of UEs using a two stage/part beam indication; (4) mapping of UE and TRPs/antenna panels to corresponding bits in a first stage/part beam indication; and/or (5) other configuration parameters following the examples given in this disclosure.

The higher layer configuration of two stage/part beam indication can be using common/cell-specific signaling and/or UE specific signaling and/or UE-group specific signaling. Furthermore, some of the configuration parameters can be updated using MAC-Layer signaling and/or physical Layer control signaling.

In step 2602, a UE monitors a physical channel of a first stage/part beam indication, and if the UE receives the corresponding channel, the UE proceeds to step 2603, else UE remains in step 2602. Examples of a UE receiving the physical channel of the first stage/part beam indication include: (1) correctly decoding a CRC of the physical channel with the corresponding RNTI; and/or (2) threshold detection of the channel/signal carrying the first stage/part beam indication.

In step 2603, a UE decodes a first stage/part beam indication. If the UE finds or determines a presence indicator for this UE, the UE proceeds to step 2604, else the UE proceeds back to step 2602.

In step 2604, a UE decodes a second stage/part beam indication, and acts upon the parameters received and proceeds back to step 2602.

For illustrative purposes the steps of this algorithm are described serially, however, some of these steps may be performed in parallel to each other.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive:
configuration information for one or more transmission configuration indication (TCI) states, associated TCI state identifiers (IDs), and a channel conveying one or more TCI state IDs, and
the channel conveying the one or more TCI state IDs; and
a processor operably coupled to the transceiver, the processor configured to:
determine, based on the one or more TCI state IDs, one or more spatial domain filters for at least one of reception of downlink channels and transmission of uplink channels, and
determine a time for applying the one or more spatial domain filters,
wherein the transceiver is further configured to at least one of:
receive, starting at the determined time, the downlink channels using the one or more spatial domain filters, and
transmit, starting at the determined time, the uplink channels using the one or more spatial domain filters,
wherein the channel conveying the one or more TCI state IDs is a physical downlink control channel (PDCCH) with a downlink control information (DCI) format used for scheduling a physical downlink shared channel (PDSCH) in a cell,
wherein the DCI format comprises the one or more TCI state IDs without downlink scheduling assignments, and
wherein the DCI format includes a bit pattern using one or more fields in the DCI format to indicate that the DCI format has no downlink scheduling assignments.

2. The UE of claim 1, wherein the determined time is based on a time of an acknowledgement of the channel conveying the one or more TCI state IDs.

3. The UE of claim 1, wherein the determined time is based on at least one of a UE capability, a sub-carrier spacing, a pre-determined time interval, and a higher layer configuration.

4. The UE of claim 1, wherein the DCI format does not include uplink scheduling grants.

5. The UE of claim 4, wherein the bit pattern further indicates that the DCI format has no uplink scheduling grants.

6. The UE of claim 1, wherein:
the channel conveying the one or more TCI state IDs is transmitted on one or more beams, and
at least one of the one or more beams is associated with one of the one or more conveyed TCI state IDs.

7. The UE of claim 1, wherein:
the channel conveying the one or more TCI state IDs is configured or determined as a two-part channel or signal; and
a first part of the two part channel or signal indicates at least one of:
an existence of a second part of the two part channel or signal,
a payload size and content of the second part,
a beam for transmission of the second part, and
resource elements and a configuration used for the second part.

8. A base station (BS) comprising:
a transceiver configured to transmit configuration information for one or more transmission configuration indication (TCI) states, associated TCI state identifiers (IDs), and a channel conveying one or more TCI state IDs; and
a processor operably coupled to the transceiver, the processor configured to:
generate the one or more TCI state IDs associated with one or more spatial domain filters, and
determine a time for applying the one or more spatial domain filters,
wherein the transceiver is further configured to:
transmit the channel conveying the one or more TCI state IDs; and
at least one of:
transmit, starting at the determined time, downlink channels using the one or more spatial domain filters, and
receive, starting at the determined time, uplink channels using the one or more spatial domain filters,
wherein the channel conveying the one or more TCI state is a physical downlink control channel (PDCCH) with a downlink control information (DCI) format used for scheduling a physical downlink shared channel (PDSCH) in a cell,
wherein the DCI format comprises the one or more TCI state IDs without downlink scheduling assignments, and
wherein the DCI format includes a bit pattern using one or more fields in the DCI format to indicate that the DCI format has no downlink scheduling assignments.

9. The BS of claim 8, wherein the determined time is based on a time of an acknowledgement of the channel conveying the one or more TCI state IDs.

10. The BS of claim 8, wherein the determined time is based on at least one of a UE capability, a sub-carrier spacing, a pre-determined time interval, and a higher layer configuration.

11. The BS of claim 8, wherein the DCI format does not include uplink scheduling grants.

12. The BS of claim 11, wherein the bit pattern further indicates that the DCI format has no uplink scheduling grants.

13. The BS of claim 8, wherein
the channel conveying the one or more TCI state IDs is transmitted on one or more beams, and
at least one of the one or more beams is associated with one of the one or more conveyed TCI state IDs.

14. The BS of claim 8, wherein:
the channel conveying the one or more TCI state IDs is configured or determined as a two-part channel or signal; and
a first part of the two part channel or signal indicates at least one of:
an existence of a second part of the two part channel or signal,
a payload size and content of the second part,
a beam for transmission of the second part, and
resource elements and a configuration used for the second part.

15. A method of operating a user equipment (UE), the method comprising:
receiving configuration information for one or more transmission configuration indication (TCI) states, associated TCI state identifiers (IDs), and a channel conveying one or more TCI state IDs;
receiving the channel conveying the one or more TCI state IDs;
determining, based on the one or more TCI state IDs, one or more spatial domain filters for at least one of reception of downlink channels and transmission of uplink channels;
determining a time for applying the one or more spatial domain filters; and
at least one of:
receiving, starting at the determined time, the downlink channels using the one or more spatial domain filters; and
transmitting, starting at the determined time, the uplink channels using the one or more spatial domain filters,
wherein the channel conveying the one or more TCI state IDs is a physical downlink control channel (PDCCH) with a downlink control information (DCI) format used for scheduling a physical downlink shared channel (PDSCH) in a cell,
wherein the DCI format comprises the one or more TCI state IDs without downlink scheduling assignments, and
wherein the DCI format includes a bit pattern using one or more fields in the DCI format to indicate that the DCI format has no downlink scheduling assignments.

16. The method of claim 15, where determining the time further comprises determining the time based on a time of an acknowledgement of the channel conveying the one or more TCI state IDs.

17. The method of claim 15, wherein the DCI format does not include uplink scheduling grants.

18. The method of claim 17, wherein the bit pattern further indicates that the DCI format has no uplink scheduling grants.

19. The method of claim 15, wherein:
the channel conveying the one or more TCI state IDs is transmitted on one or more beams, and
at least one of the one or more beams is associated with one of the one or more conveyed TCI state IDs.

20. The method of claim 15, wherein:
the channel conveying the one or more TCI state IDs is configured or determined as a two-part channel or signal, and
a first part of the two part channel or signal indicates at least one of:

an existence of a second part of the two part channel or signal,
a payload size and content of the second part,
a beam for transmission of the second part, and
resource elements and a configuration used for the second part.

* * * * *